United States Patent
Yoo et al.

(10) Patent No.: US 10,579,865 B2
(45) Date of Patent: Mar. 3, 2020

(54) FACIAL VERIFICATION METHOD AND APPARATUS

(71) Applicant: Samsung Electronics Co., Ltd., Suwon-si (KR)

(72) Inventors: Byungin Yoo, Seoul (KR); Youngjun Kwak, Seoul (KR); Youngsung Kim, Suwon-si (KR); JaeJoon Han, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 110 days.

(21) Appl. No.: 15/896,253

(22) Filed: Feb. 14, 2018

(65) Prior Publication Data

US 2018/0373924 A1    Dec. 27, 2018

(30) Foreign Application Priority Data

Jun. 26, 2017    (KR) .................. 10-2017-0080448

(51) Int. Cl.
*G06K 9/00*    (2006.01)
*G06K 9/46*    (2006.01)
(Continued)

(52) U.S. Cl.
CPC ......... *G06K 9/00288* (2013.01); *G06F 21/32* (2013.01); *G06K 9/00248* (2013.01);
(Continued)

(58) Field of Classification Search
CPC .......... G06K 9/00268; G06K 9/00281; G06K 9/6267; G06K 9/00288; G06K 9/00221;
(Continued)

(56) References Cited

U.S. PATENT DOCUMENTS 7,835,541 B2 * 11/2010 Lee .................. G06K 9/00228
382/103
9,076,029 B2    7/2015 Free
(Continued)

FOREIGN PATENT DOCUMENTS

CN            202018662 U    10/2011
KR    10-2016-0059768 A     5/2016
(Continued)

OTHER PUBLICATIONS

Extended European search report dated Sep. 27, 2018 in European Patent Application No. 18165194.4 (6 pages in English).

*Primary Examiner* — Aklilu K Woldemariam
(74) *Attorney, Agent, or Firm* — NSIP Law

(57) ABSTRACT

Disclosed is a facial verification apparatus and method. The facial verification apparatus is configured to detect a face area of a user from an obtained input image, generate a plurality of image patches, differently including respective portions of the detected face area, based on a consideration of an image patch set determination criterion with respect to the detected face area, extract a feature value corresponding to a face of the user based on an image patch set including the generated plurality of image patches, determine whether a facial verification is successful based on the extracted feature value, and indicate a result of the determination of whether the facial verification is successful.

35 Claims, 18 Drawing Sheets

(51) Int. Cl.
    *G06F 21/32*    (2013.01)
    *G06K 9/62*     (2006.01)
(52) U.S. Cl.
    CPC ....... *G06K 9/00281* (2013.01); *G06K 9/4628*
              (2013.01); *G06K 9/6262* (2013.01)
(58) Field of Classification Search
    CPC .......... G06K 9/00228; G06K 9/00832; G06K
              9/00248; G06K 9/00744; G06K 9/6232;
              G06K 9/629; G06K 9/4676; G06K
              9/4685; G06K 9/00241; G06K 9/00979;
              G06K 9/036; G06K 9/3233; G06K
              9/00147; G06K 9/6269; G06K 9/00261;
              G06K 9/6262; G06K 9/00798; G06K
              9/4671; G06K 9/6256; G06K 2209/03;
              G06K 9/4628; A61B 5/7221; A61B
              5/7267; G06F 21/32; G06F 21/316; G06F
              16/285; G06F 16/248; G06T 7/00; G06T
              7/246; G06T 7/33; G06T 2207/10012;
              G06T 2207/20016; G06T 7/55; G06T
              7/593; G06Q 20/40145; H04L 63/0861;
                          H04N 7/183; G06N 3/08
    USPC ....... 382/115, 118, 159, 168, 177, 187, 190;
                                              348/428, 619
    See application file for complete search history.

(56)                References Cited

U.S. PATENT DOCUMENTS

| | | | |
|---|---|---|---|
| 9,384,385 B2 | 7/2016 | Park et al. | |
| 9,489,567 B2 | 11/2016 | Wang et al. | |
| 9,953,149 B2* | 4/2018 | Tussy | G06K 9/00288 |
| 2002/0135618 A1* | 9/2002 | Maes | G06F 3/0481 |
| | | | 715/767 |
| 2005/0117783 A1* | 6/2005 | Sung | G06K 9/00288 |
| | | | 382/118 |
| 2006/0008150 A1* | 1/2006 | Zhao | G06K 9/00248 |
| | | | 382/190 |
| 2006/0153429 A1* | 7/2006 | Gehlen | G06K 9/00228 |
| | | | 382/118 |
| 2010/0008581 A1* | 1/2010 | Bressan | G06K 9/00859 |
| | | | 382/177 |
| 2010/0265354 A1* | 10/2010 | Kameyama | H04N 19/17 |
| | | | 348/222.1 |
| 2010/0329568 A1* | 12/2010 | Gamliel | G06K 9/00241 |
| | | | 382/190 |
| 2011/0165893 A1* | 7/2011 | Hyung | G01S 5/0252 |
| | | | 455/457 |
| 2012/0032960 A1* | 2/2012 | Kameyama | H04N 7/17318 |
| | | | 345/428 |
| 2012/0033874 A1* | 2/2012 | Perronnin | G06K 9/00879 |
| | | | 382/159 |
| 2012/0148117 A1* | 6/2012 | Chang | G06K 9/00221 |
| | | | 382/118 |
| 2013/0142402 A1* | 6/2013 | Myers | G06K 9/00288 |
| | | | 382/118 |
| 2013/0243274 A1 | 9/2013 | Sukegawa et al. | |
| 2014/0015930 A1* | 1/2014 | Sengupta | G06K 9/00771 |
| | | | 348/46 |
| 2014/0201126 A1* | 7/2014 | Zadeh | G06N 7/005 |
| | | | 706/52 |
| 2015/0033362 A1* | 1/2015 | Mau | G06K 9/00288 |
| | | | 726/27 |
| 2015/0125049 A1* | 5/2015 | Taigman | G06T 3/0093 |
| | | | 382/118 |
| 2015/0154743 A1 | 6/2015 | Ioffe et al. | |
| 2015/0242689 A1* | 8/2015 | Mau | G06Q 50/01 |
| | | | 382/190 |
| 2015/0242707 A1* | 8/2015 | Wilf | G06K 9/00302 |
| | | | 382/159 |
| 2015/0269420 A1* | 9/2015 | Kim | G06K 9/00268 |
| | | | 382/118 |
| 2015/0363634 A1* | 12/2015 | Yin | G06K 9/00221 |
| | | | 382/118 |
| 2016/0171291 A1 | 6/2016 | Papakipos et al. | |
| 2016/0224826 A1 | 8/2016 | Yagnik | |
| 2016/0379041 A1 | 12/2016 | Rhee et al. | |
| 2017/0124385 A1* | 5/2017 | Ganong | G06K 9/00677 |
| 2017/0185760 A1* | 6/2017 | Wilder | G06F 21/36 |
| 2018/0239955 A1* | 8/2018 | Rodriguez | G06K 9/0061 |

FOREIGN PATENT DOCUMENTS

| | | |
|---|---|---|
| KR | 10-2016-0061856 A | 6/2016 |
| KR | 10-1656373 B1 | 9/2016 |
| KR | 10-2017-0000748 A | 1/2017 |
| WO | WO 2016/049655 A1 | 3/2016 |

* cited by examiner

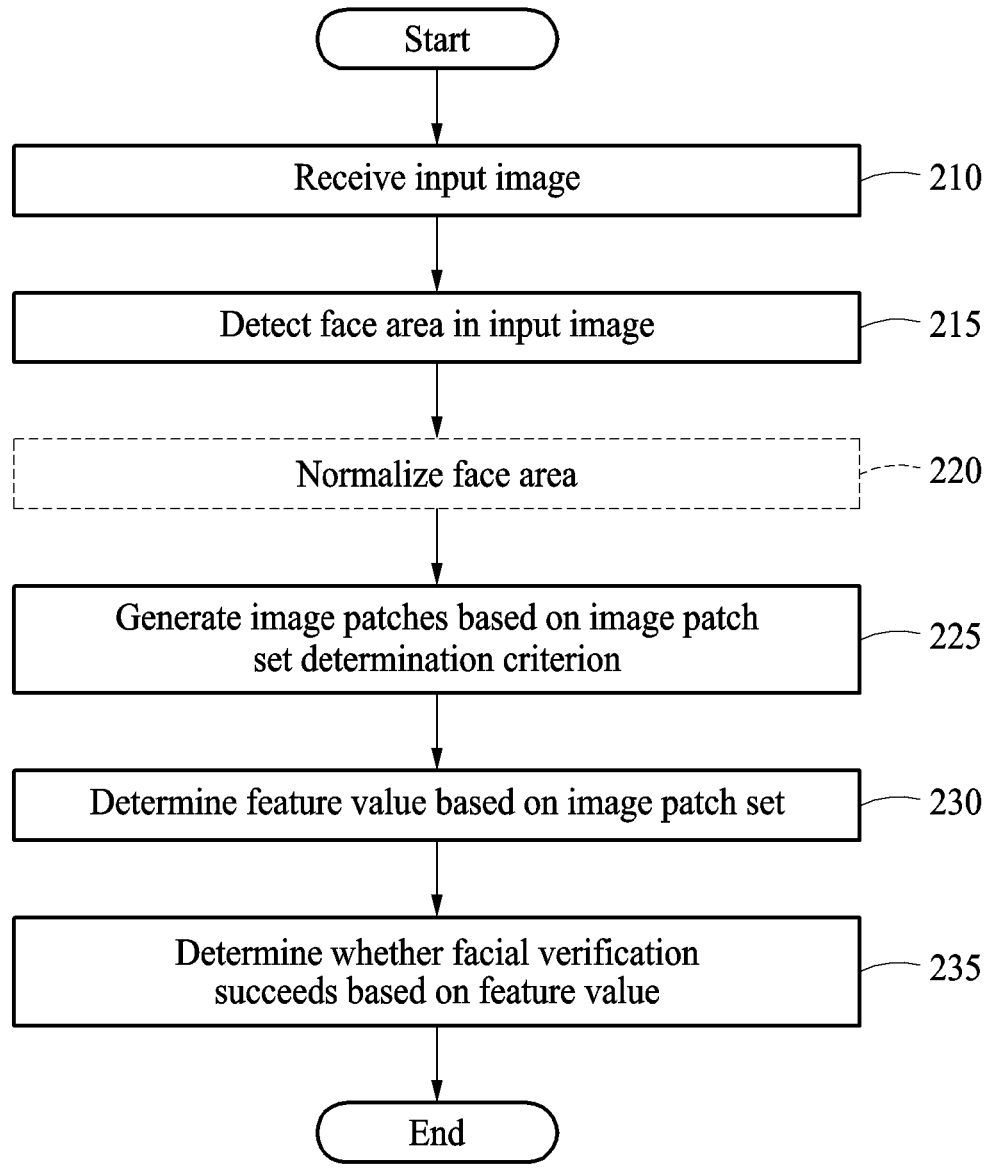

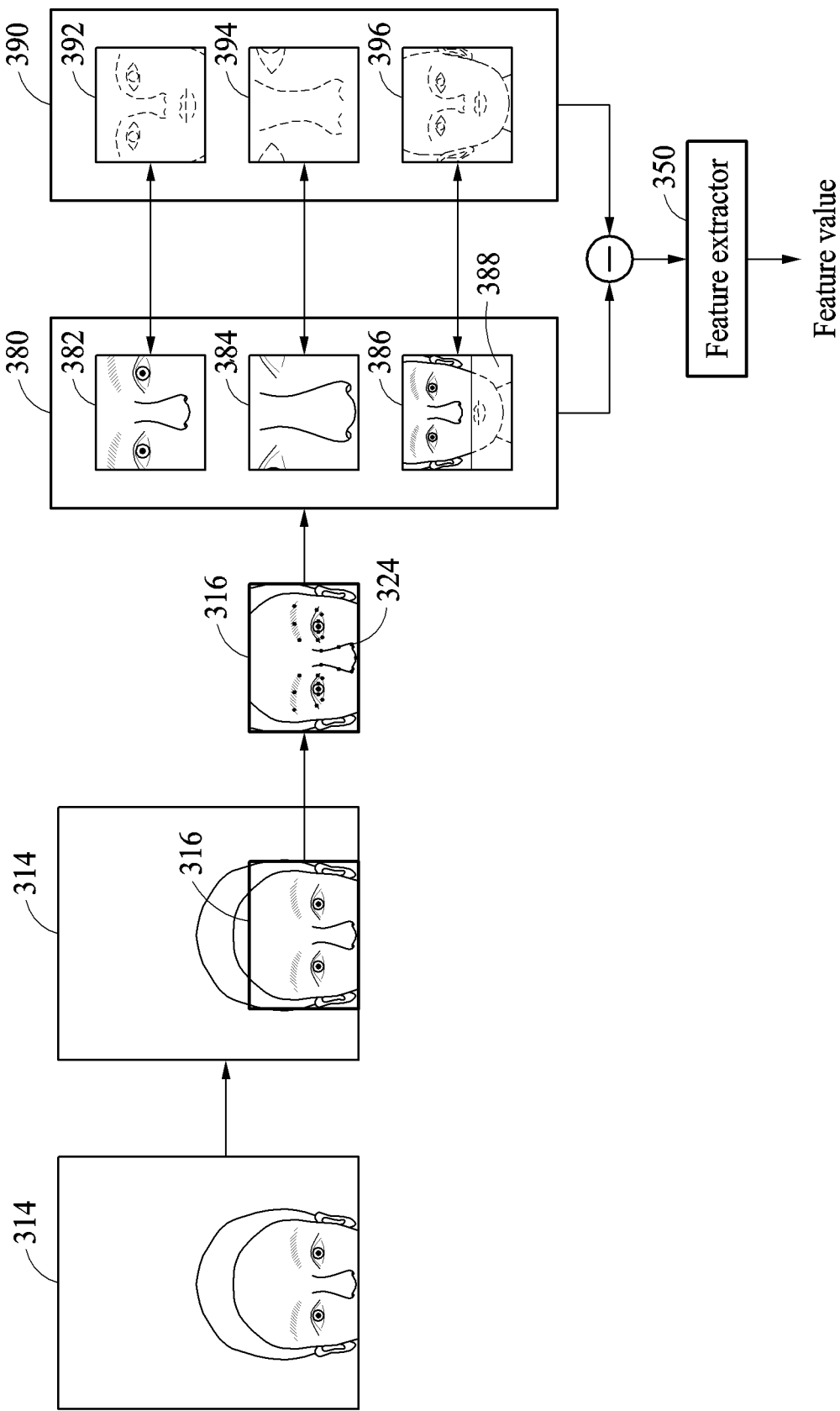

FACIAL VERIFICATION METHOD AND APPARATUS

CROSS-REFERENCE TO RELATED APPLICATIONS

This application claims the benefit under 35 USC § 119(a) of Korean Patent Application No. 10-2017-0080448 filed on Jun. 26, 2017 in the Korean Intellectual Property Office, the entire disclosure of which is incorporated herein by reference for all purposes.

BACKGROUND

1. Field

The following description relates to facial verification technology.

2. Description of Related Art

Facial verification technology of biometric authentication technology may include authentication technology for determining whether a user is valid based on a face appearing in a static or moving images. Such facial verification technology has an advantage that contactless verification may be performed on a verification target.

SUMMARY

This Summary is provided to introduce a selection of concepts in a simplified form that are further described below in the Detailed Description. This Summary is not intended to identify key features or essential features of the claimed subject matter, nor is the Summary intended to be used as an aid in determining the scope of the claimed subject matter.

In one general aspect, a processor implemented facial verification method includes detecting a face area of a user from an obtained input image, generating a plurality of image patches, differently including respective portions of the detected face area, based on a consideration of an image patch set determination criterion with respect to the detected face area, extracting a feature value corresponding to a face of the user based on an image patch set including the generated plurality of image patches, determining whether a facial verification is successful based on the extracted feature value, and indicating a result of the determination of whether the facial verification is successful.

The extracting of the feature value may include providing image information derived from the plurality of image patches to a trained feature extractor neural network, an output of the trained feature extractor neural network being the extracted feature value.

The method may further include determining the image information by comparing the plurality of image patches to different select reference images, the different select reference images being selected dependent on the consideration of the image patch set determination criterion or based on a selected composition of the plurality of the image patches that is dependent on the consideration of the image patch set determination criterion.

The determining of whether the facial verification is successful may include comparing the extracted feature value to a select registration feature value, the select registration feature value being selected from plural registration feature values dependent on the consideration of the image patch set determination criterion or based on a select composition of the plurality of the image patches that is dependent on the consideration of the image patch set determination criterion.

The method may further include generating the plural registration feature values by generating, for each of the plural registration feature values, a registration image set including a plurality of registration image patches, respectively and differently including respective portions of a corresponding registration face area, corresponding to different predetermined available results of considerations of the image patch set determination criterion with respect to input face areas, and extracting the plural registration feature values using the trained feature extractor neural network considering the respectively generated registration image sets.

The consideration of the image patch set determination criterion with respect to the detected face area may include a determination of a detection position of the face area and/or whether an occlusion region is present in the detected face area.

The consideration of the image patch set determination criterion with respect to the detected face area may include a determination of a detection position of the detected face area, and the generating of the plurality of image patches may include generating the plurality of image patches based on a set composition, among set predefined compositions for image patch sets, corresponding to the determined detection position of the detected face area.

The generating of the plurality of image patches may include generating, in response to the determined detection position of the detected face area being a predefined first area, the plurality of image patches based on a first set composition corresponding to the first area, and generating, in response to the determined detection position of the detected face area being a predefined second area, the plurality of image patches based on a second set composition corresponding to the second area.

The consideration of the image patch set determination criterion with respect to the detected face area may include a determination of whether an occlusion region is present in the detected face area, and the generating of the plurality of image patches may include generating the plurality of image patches based on a predefined first set composition in response to the occlusion region being determined to be present in the face area, and generating the plurality of image patches based on a predefined second set composition in response to the occlusion region being determined to be absent in the face area.

The generating of the plurality of image patches based on the predefined first set composition further may further include generating the plurality of image patches from among a select one, as the predefined first set composition, of a plurality of first set compositions, where the selected one of the plurality of the first set compositions may be selected from among the plurality of first set compositions dependent on a determination of an occlusion type, from among different occlusion types, of the occlusion region.

The extracting of the feature value may include extracting the feature value based on the plurality of image patches included in the image patch set and reference image patches predetermined to correspond to a composition of the image patch set.

The reference image patches may be determined based on any one or any combination of a determined detection position of the detected face area, a determination of whether an occlusion region is present in the detected face area, a determination of a facial expression in the detected face area, a determination of user information estimated based on the detected face area, a determination of an illumination state of the input image, and a determination of an image quality of the input image.

The extracting of the feature value may include extracting the feature value using a feature extractor considering differences between the plurality of image patches included in the image patch set and the reference image patches each respectively predefined to correspond to respective forms of the plurality of image patches.

The reference image patches may be derived from training image patches used to train the feature extractor.

The image patch set may include the generated plurality of image patches and an additional image patch corresponding to an indication of a result of the consideration of the image patch set determination criterion, and the extracting of the feature value may include extracting the feature value from image information derived from the generated plurality of image patches and the additional image patch.

The performing of the consideration of the image patch set determination criterion with respect to the detected face area may include examining the input image based on the image patch set determination criterion, where the generating of the plurality of image patches may include generating the plurality of image patches based on a result of the examining of the input image.

The examining of the input image may include examining any one or any combination of a detection position of the detected face area, whether an occlusion region is present in the detected face area, a facial expression of the detected face area, user information estimated based on the detected face area, an illumination state of the input image, and an image quality of the input image.

The extracting of the feature value may include extracting the feature value using a single feature extractor neural network.

The image patch set may include a first image patch corresponding to an overall area of the detected face area and a second image patch that is a zoomed-in image patch, of the detected face area, in comparison to the first image patch.

The method may further include detecting facial landmarks in the detected face area, and normalizing the detected face area based on the detected facial landmarks, where the generating of the plurality of image patches may include generating the plurality of image patches based on the normalized face area.

In one general aspect, provided is a non-transitory computer-readable storage medium storing instructions that, when executed by a processor, cause the processor to perform any one, combination, or all operations or facial verification methods described herein.

In one general aspect, provided is a facial verification apparatus including a processor configured to detect a face area of a user from an obtained input image, generate a plurality of image patches, differently including respective portions of the detected face area, based on a consideration of an image patch set determination criterion with respect to the detected face area, extract a feature value corresponding to a face of the user based on an image patch set including the generated plurality of image patches, determine whether a facial verification is successful based on the extracted feature value, and indicate a result of the determination of whether the facial verification is successful.

The processor may be configured to generate the plurality of image patches based on a set composition, among set predefined compositions for image patch sets, dependent on a result of the comparison of the image patch set determination criterion with respect to the detected face area.

The consideration of the image patch set determination criterion with respect to the detected face area may include determining a detection position of the face area, and the processor may be configured to generate, in response to the determined detection position of the detected face area being a predefined first area, the plurality of image patches based on a first set composition corresponding to the first area, and generate, in response to the determined detection position of the detected face area being a predefined second area, the plurality of image patches based on a second set composition corresponding to the second area.

The consideration of the image patch set determination criterion with respect to the detected face area may include determining whether an occlusion region is present in the face area, and the processor may be configured to generate the plurality of image patches based on a predefined first set composition in response to the occlusion region being determined to be present in the face area, and generate the plurality of image patches based on a predefined second set composition in response to the occlusion region being determined to be absent in the face area.

In the generating of the plurality of image patches based on the predefined first set composition, the predefined first set composition may be a selected one of a plurality of first set compositions, where the selected one of the plurality of the first set compositions may be selected from among the plurality of first set compositions dependent on a determination of an occlusion type, from among different occlusion types, of the occlusion region.

The processor may be configured to extract the feature value based on the plurality of image patches included in the image patch set and reference image patches predetermined to correspond to a composition of the image patch set.

The reference image patches may be determined based on any one or any combination of a determined detection position of the detected face area, a determination of whether an occlusion region is present in the detected face area, a determination of a facial expression in the detected face area, a determination of user information estimated based on the detected face area, a determination of an illumination state of the input image, and a determination of an image quality of the input image.

The extracting of the feature value may include extracting the feature value using a feature extractor considering differences between the plurality of image patches included in the image patch set and the reference image patches each respectively predefined to correspond to respective forms of the plurality of image patches.

The reference image patches may be derived from training image patches used to train the feature extractor.

In one general aspect, a processor implemented facial verification method includes detecting a face area of a user from an obtained input image, determining whether the face area is a partial face area and/or whether the face area includes an occlusion, generating, based on a result of the determining, a first image patch including at least a first portion of the face area image, generating, based on the result of the determining, a second image patch including at least a second portion of the face area image, the second image patch being different from the first image patch, generating image information from the first image patch and the second image patch, providing the generated image information to a feature extractor to extract a feature value corresponding to a face of the user, and indicating whether a facial verification is successful based on a comparison of the extracted feature value to a registered feature value of plural registration feature values.

The generating of the image information from the first image patch and the second image patch may include obtaining differences between the first and second image patches and select reference image patches and generating the image information based on the obtained differences, and the select reference image patches may be selected, dependent on the result of the determining of whether the face area is the partial face area and/or whether the face area includes the occlusion, from among a plurality of reference image patches.

The method may further include performing a registration process to generate the plural registration feature values, each registration feature value being generated based on consideration, by the feature extractor, of respectively different registration image information of respective registration image patch sets, each respective registration image patch set including plural registration image patches selectively derived from a same registration image, where, in the comparison of the extracted feature value to the registered feature value of the plural registration feature values, the registered feature value may be a select registered feature value of the plural registration feature values.

The select one of the generated registration feature values may be selected, from the plural registration feature values, dependent on a result of the determining of whether the face area is the partial face area and/or whether the face area includes the occlusion.

Other features and aspects will be apparent from the following detailed description, the drawings, and the claims.

BRIEF DESCRIPTION OF THE DRAWINGS

FIG. 2A illustrates an example of a facial verification method in accordance with one or more embodiments.

FIGS. 3A through 3C illustrate examples of configuring an image patch set based on a detection position of a face area and determining a feature value, in accordance with varying embodiments.

Figure 1A:
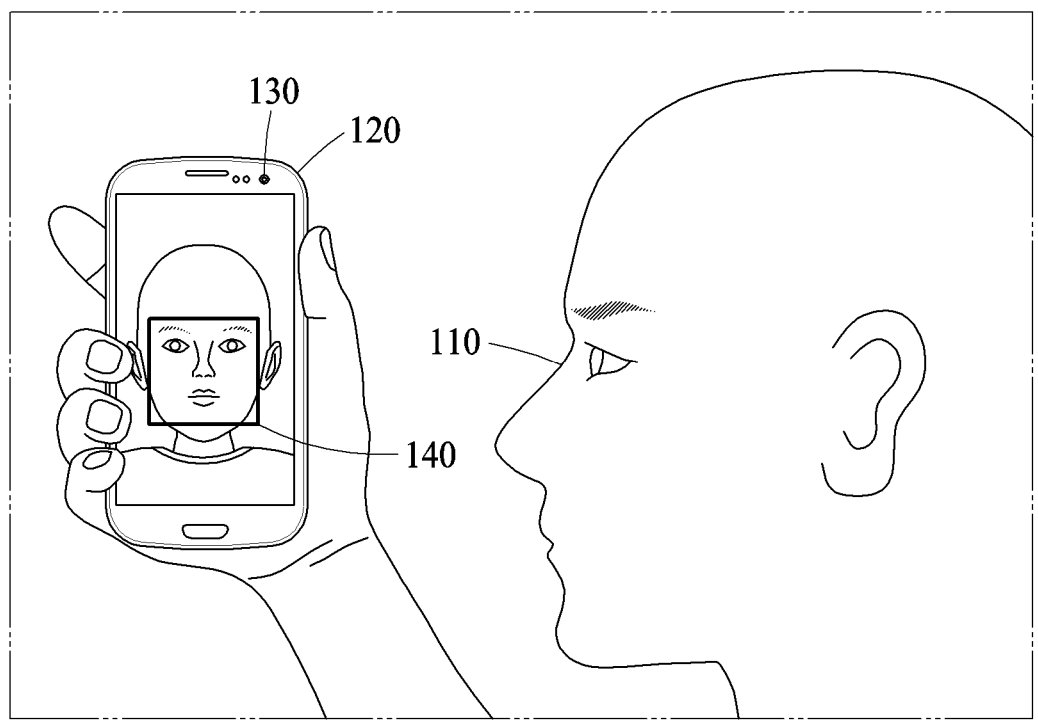
FIGS. 1A through 1C illustrate examples of a facial verification in accordance with varying embodiments.

Throughout the drawings and the detailed description, unless otherwise described or provided, the same drawing reference numerals will be understood to refer to the same or like elements, features, and structures. The drawings may not be to scale, and the relative size, proportions, and depiction of elements in the drawings may be exaggerated for clarity, illustration, and convenience.

DETAILED DESCRIPTION

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order. Also, descriptions of features that are known after an understanding of the disclosure of this application may be omitted for increased clarity and conciseness.

The features described herein may be embodied in different forms, and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application.

Terms such as first, second, A, B, (a), (b), and the like may be used herein to describe components. Each of these terminologies is not used to define an essence, order or sequence of a corresponding component but used merely to distinguish the corresponding component from other component(s). For example, a first component may be referred to a second component, and similarly the second component may also be referred to as the first component.

It should be noted that if it is described in the specification that one component is "connected," "coupled," or "joined" to another component, a third component may be "connected," "coupled," and "joined" between the first and second components, although the first component may be directly connected, coupled or joined to the second component.

The terminology used herein is for describing various examples only, and is not to be used to limit the disclosure. For example, the articles "a," "an," and "the" are intended to include the plural forms as well, unless the context clearly indicates otherwise. As further used herein, the terms "comprises," "includes," and "has" specify the presence of stated features, numbers, operations, members, elements, components, and/or combinations thereof, but do not preclude the presence or addition of one or more other features, numbers, operations, members, elements, components, and/or combinations thereof in alternative embodiments. In addition, further alternative embodiments that lack such stated features, numbers, operations, members, elements, components, and/or combinations thereof exist unless the context and understanding of the present disclosure indicates otherwise. In addition, the use of the term 'may' herein with respect to an example or embodiment, e.g., as to what an example or embodiment may include or implement, means that at least one example or embodiment exists where such a feature is included or implemented while all examples and embodiments are not limited thereto.

Unless otherwise defined, all terms, including technical and scientific terms, used herein have the same meaning as commonly understood by one of ordinary skill in the art to which this disclosure pertains based on an understanding of the present disclosure. Terms, such as those defined in commonly used dictionaries, are to be interpreted as having a meaning that is consistent with their meaning in the context of the relevant art and the present disclosure, and are not to be interpreted in an idealized or overly formal sense unless expressly so defined herein.

Figure 1B:
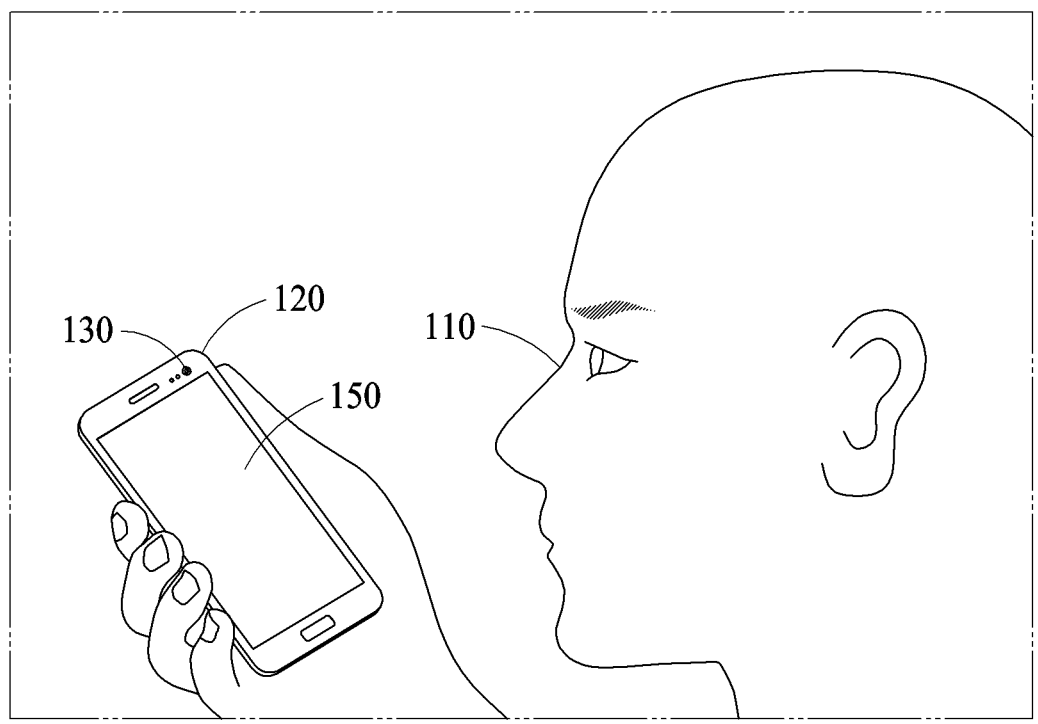
Figure 1C:
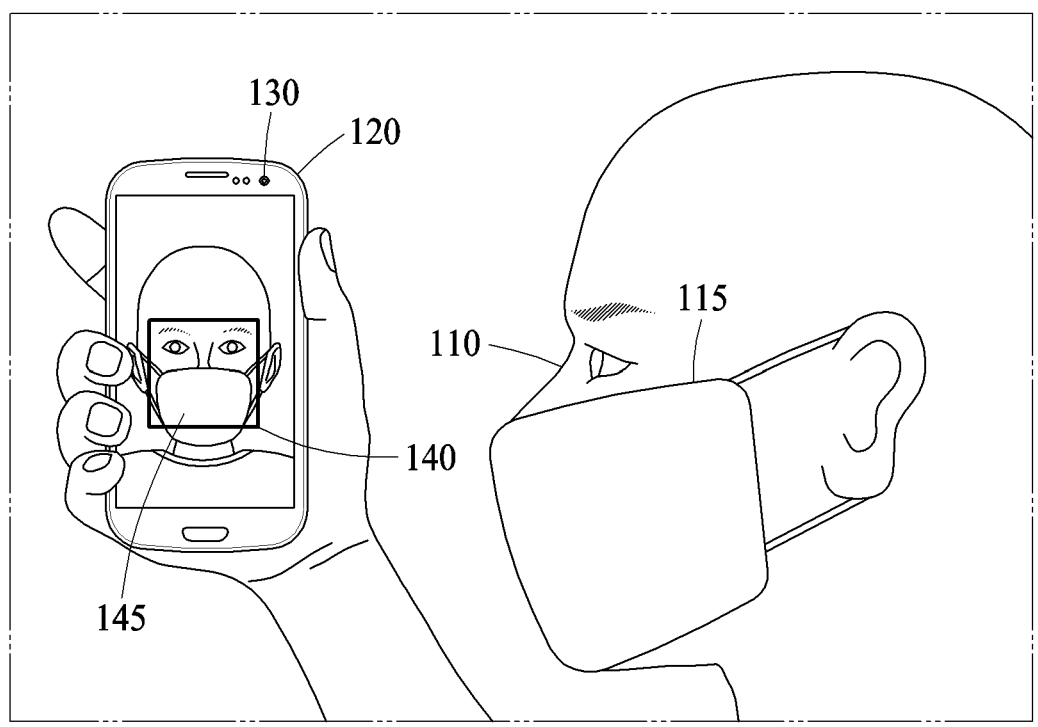

FIGS. 1A through 1C illustrate examples of a facial verification in accordance with various embodiments.

A facial verification refers to a verification method used to determine whether a user is a valid user based on face information of the user, and verify a valid user in user log-in, payment services, and access control, as non-limiting examples. Referring to FIG. 1A, a facial verification apparatus configured to perform such a facial verification is included in, or represented by, a computing apparatus 120. The computing apparatus 120 includes, for example, a smartphone, a wearable device, a tablet computer, a netbook, a laptop computer, a desktop computer, a personal digital assistant (PDA), a set-top box, a home appliance, a biometrics-based door lock, a security device, and a vehicle start device.

As non-limiting examples, the computing apparatus 120 performs a facial verification on a user 110 attempting to have access to the computing apparatus 120. For example, in an example the user 110 attempts at a user authentication in the computing apparatus 120 to cancel a 'lock' state of the computing apparatus 120, e.g., to 'unlock' the computing apparatus 120, for authority to use a service or function available or performed by the computing apparatus 120, or to control an extent of use of such a service or function, or of another computing apparatus or server, for example, by the computing apparatus 120 obtaining a face image of the user 110, such as by using an image acquirer or capturer, for example, a camera 130 of the computing apparatus 120, analyzing the obtained face image, and determining whether to cancel the lock state of the computing apparatus 120, permit use of the service or function, or enable control of one or more extents of the same. The face image may otherwise be obtained, e.g., by input or reception through a hardware communication module of the computing apparatus 120 or by reading from a memory of the computing apparatus 120. The obtained image(s) may thus be image(s) that are obtained by the computing apparatus 120, as a target of the face verification. The obtained image(s) may include color images, grayscale images, IR images, and/or depth images, as non-limiting examples.

In such examples, if a determined similarity between features extracted from a registration image and features extracted from a registered verification image meets respective thresholds dependent on the functions or purposes of the verification, and/or dependent how different feature recognition results are considered for such functions of purposes, then the user may be determined to be a valid user of the computing apparatus 120, to obtain or be provided such aforementioned functionalities of the computing apparatus 120. The user may also be permitted to gain access to a restricted area or zone, or the user may be authorized to access or implement a financial transaction or payment, as only non-limiting examples, based on results of the verification. In an example, there may also, or alternatively, be different thresholds (and/or different feature recognition result considerations) for different levels of access to the computing apparatus 120 or the example restricted area, or the access or implementation of financial transactions or payments. Depending on the ultimate results of the verification, the user 110 may be notified of the successful verification through the display 150, or the example further operations may merely be available through the display 150 thereby inferring the successful verification. As another example, successfulness and non-successfulness of the verification may be notified to another user, server, or service.

Thus, in an example, the face verification apparatus may detect a face region 140 from the input image and respectively extract one or more features from the face region 140 using a hardware implemented recognizer. The recognizer is a hardware implemented model extracting features, for example, a feature, feature vector, or feature map, from or corresponding to input information. For example, the recognizer may be a neural network or other machine learning model trained based on learning data, or recognizer portion of such a neural network or machine learning model. The recognizer may thus include or be synonymous herein with one or more feature extractors or discriminators. Herein, a feature extractor is also synonymous with one or more feature extractors. The recognizer may further include one or more stages or levels of feature extraction or discrimination, as well as other stages or levels, to ultimately generate or output such extracted features.

The face verification apparatus may compare the feature extracted by the recognizer to a feature registered through a face registration process, for example, and determine whether the verification is successful based on a result of the comparison. With the above neural network or machine learning examples, such comparisons may be implemented by additional neural network or machine learning models, or within a same neural network or machine learning model that included the recognizer neural network portion. The user 110 corresponding to a valid user may register a face in the computing apparatus 120 through the face registration process of the computing apparatus 120 at a first time, the computing apparatus 120 may then store recognized registration feature(s) of the user 110 determined as valid through the face registration process, which may then be considered by the face verification apparatus during a verification process at a second time. The computing apparatus 120 may store such registration information on the valid user in a storage included in the computing apparatus 120, in a cloud storage external to the computing apparatus 120, or shared by another computing apparatus 120. For example, a face image of a valid user or a feature extracted from the face image may be stored as the registration information of the valid user.

Thus, with the above 'locked' mode example, in response to the user authentication being determined to be successful while the computing apparatus 120 is operating in the locked mode, the user 110 successfully cancels the lock mode of the computing apparatus 120. Conversely, in response to the user authentication being determined to be unsuccessful, the computing apparatus 120 continues to operate in the locked mode. A valid user registers, in advance, a face of the valid user in the computing apparatus 120 in a face registration process, and the computing apparatus 120 stores registration information on the valid user in a storage included in the computing apparatus 120 or in a cloud storage external to the computing apparatus 120. For example, a face image of a valid user or feature(s) extracted from the face image is stored as the registration information of the valid user.

In one example, the face image may be captured through the camera 130 by the user 110 for the facial verification and also provided through a display of the computing apparatus 120, as a preview image for guiding the user to align the user's face with an example center area of the captured image. In this example, by referring to the preview image, the user 110 adjusts a facial type to be input for the facial verification, e.g., so the facial verification is performed on the whole or full face image.

As discussed above, to attempt at the facial verification, the user 110 may capture an image of a face of the user 110 using the camera 130. Here, in response to the face being captured out of a field of view (FoV) of the camera 130, an image of a partial face, in lieu of a full face, is obtained. For example, as illustrated in FIG. 1B, in a case in which the user 110 attempts at the facial verification while holding the computing apparatus 120 at an angle, an image of only a partial face is obtained because a full face is not within the FoV of the camera 130.

In an example where the aforementioned preview image is not displayed on the screen 150, e.g., as oriented relative to the user so as to be viewable by the user 110 in the facial verification process, a partial face is obtained in the facial verification process. Thus, this may occur in a relatively great number of cases when the preview image is not provided. Rather, if the preview image is provided to the user 110, the user 110 may be able to use the preview image as a guide to reorient the user 110 with the camera 130 to obtain the full face instead of the partial face for the facial verification. However, in the example where the preview image is not provided to the user 110, the user 110 may not be able to know whether the full face or the partial face has been obtained, and the user 110 may not be able to readily adjust an image to be captured to obtain the full face, and thus only an image of a partial face may be obtained.

An image with only a partial face may include a smaller number of features that can be used to identify a user compared to an image with a full face, and thus typically a facial verification performed using such a partial face may generally have a lower accuracy compared to a facial verification performed using a full face.

Thus, as a full face is not always input for a facial verification, it is found herein that a method of increasing an accuracy of facial verification despite an input of only a partial face may be desired. For example, in an example, such a preview image is not provided in a facial verification process of the computing apparatus 120. In such a case, despite an input of such a partial face, one or more examples hereinafter may increase a probability of the facial verification being determined to a success with increased an accuracy, even if the considered obtained face is a partial face, i.e., less than the full face. For example, one or more examples herein provide methods and implemented verifications by computing apparatuses that enable facial verification without a provision of such a preview image when an image of a face is obtained, while still performing the corresponding facial verification accurately, i.e., more accurately than previous approaches where facial verification was performed based on the partial face.

In addition, as illustrated in FIG. 1C, when the user 110 wearing a mask 115 attempts at the facial verification with the computing apparatus 120, an occlusion region 145 corresponding to the mask 115 appears on the face image captured by the camera 130 of the computing apparatus 120. The occlusion region 145 may also appear due to, for example, glasses, sunglasses, and a hat alternatively or in addition to the mask 115.

Such an occlusion region may typically hinder an extraction of a unique feature of a user from the input face included in the input image, and also typically degrade an accuracy of a facial verification. However, one or more examples provide a verification method that may enable facial verification to be performed with increased accuracy, e.g., over typical approaches, although the occlusion region 145 is present in the face area 140.

For example, the computing apparatus 120, e.g., including or representing a facial verification apparatus, may be configured to selectively configure multiple image patches, including a plurality of image patches based on an image captured to be used for a facial verification, and perform facial verification based on the collective consideration of the selectively configured multiple image patches. An image patch may be a select image including the face area 140 as a whole/full or part. Also, herein, a partial face image or an image with a part of face is an image that does not include the whole or full face. The composition or configuration of the multiple image patches may be determined based on a determined condition, for example, a determined relative position of the face appearing in the corresponding image, whether an occlusion is present, an image quality, an illumination state, a facial expression, and/or estimated information such as an age, a gender and the like of a user, as non-limiting examples. The facial verification apparatus may adaptively configure the multiple image patches based on a determined state of the image captured for the facial verification and may improve the accuracy of the facial verification, i.e., over typical technological approaches, by performing the facial verification based on the adaptively configured multiple image patches.

Figure 9:
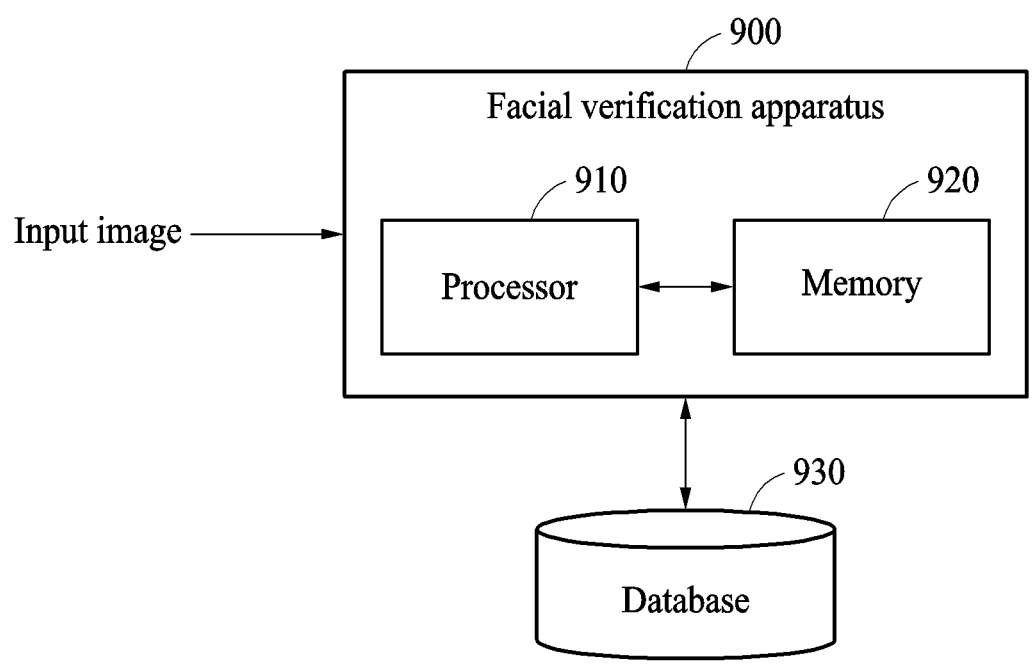
FIG. 9 illustrates an example of a facial verification apparatus in accordance with one or more embodiments.
Figure 10:
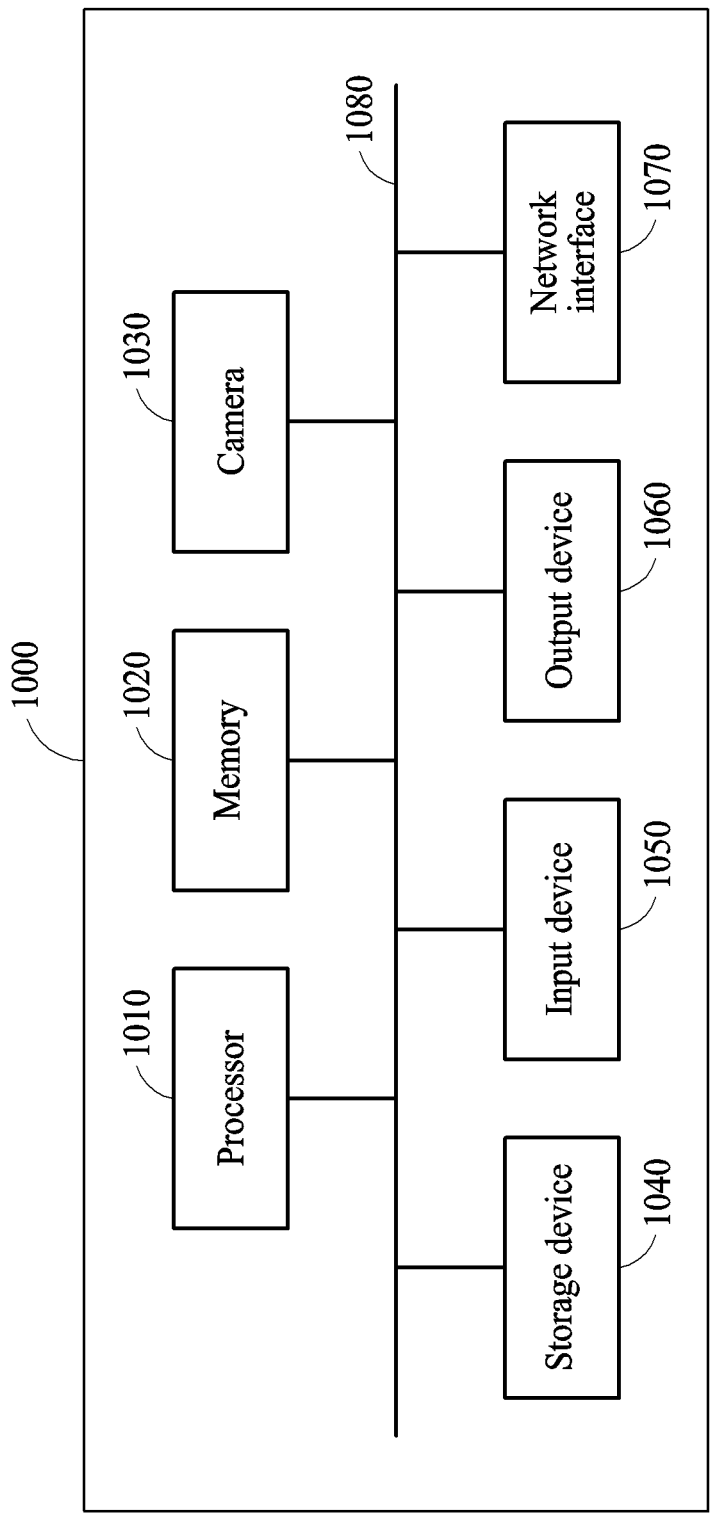
FIG. 10 illustrates an example of a computing apparatus in accordance with one or more embodiments.
Figure 11:
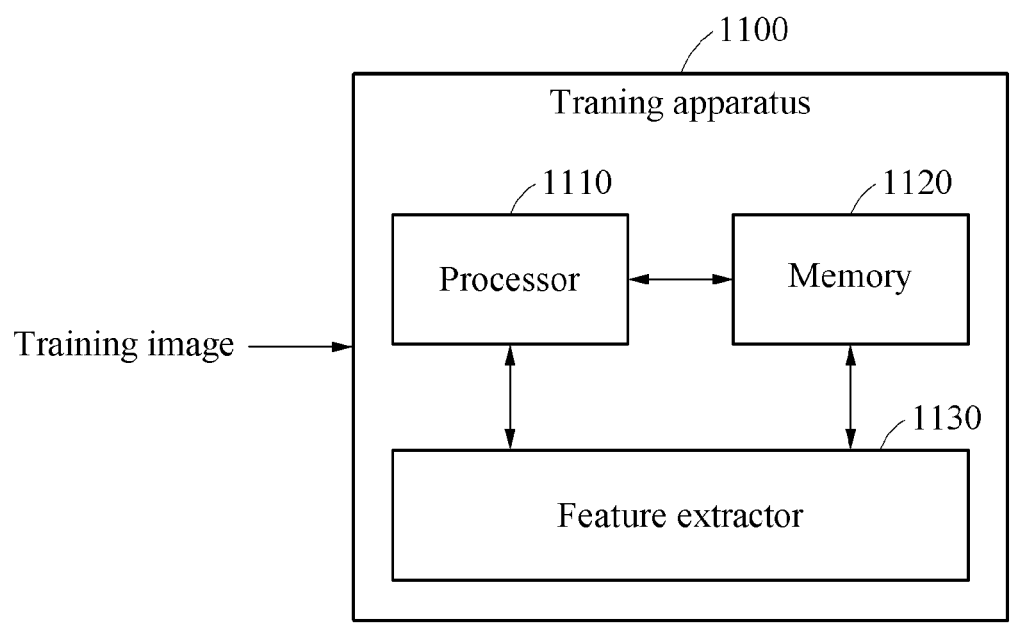
FIG. 11 is a diagram illustrating an example of a training apparatus in accordance with one or more embodiments.

In examples, such as the computing apparatus 120 of FIG. 1, the facial verification apparatus 900 of FIG. 9, computing apparatus 1000 of FIG. 10, and training apparatus 1100 of FIG. 11, each of which herein can individually and collectively be referred to as respective facial verification apparatuses, each facial verification apparatus includes one or more processors configured to perform face verification based on one or more verification images and to output a verification result, perform further operations based on the verification result, and/or perform face registration based on one or more registration images. The verification result indicates, e.g., either through explicit or inferential indications, whether a face included in the verification image corresponds to a valid user, for example. For example, when the face included in the verification image corresponds to the valid user, the verification result may include information indicating that verification has succeeded, and when the face included in the verification image does not correspond to the valid user, the verification result may alternatively include information indicating that the verification has failed. Alternatively, such as where face verification is performed for a device unlocking, payment function, or automatically performed or performed in a background operation, e.g., without request or potential knowledge of the user, a successful or failed verification result may not be explicitly reported to the user, but the successful or failure indications may be through inferential operations to control/institute additional operations (or non-operation of the same), or output results may be implicitly or explicitly indicated to another device or server that may receive or monitor results of the face verification or results of face verifications of one or more captured faces from one or more such facial verification apparatuses. Thus, the verification result may be indicated through, and used for, implementing or initiating of further processing of the facial verification apparatus, such as further processing operations in which user verification may be beneficial or required. As only examples, when the face included in the verification image is verified as a face of the valid user by the facial verification apparatus, the facial verification apparatus may unlock a user interface of the facial verification apparatus, such as when the facial verification apparatus is a user terminal, e.g., a smart phone or tablet, and the unlocking enables the user to access additional information or perform additional functions of user terminal, or the facial verification apparatus may control or indicate to an external device to permit entry of a user to a restricted area or zone due to the face verification, or may authorize financial or payment transactions to proceed or be initiated, as well as alternative operations or processes depending on embodiment.

The face verification is performed by comparing information on one or more verification images to information on one or more registration images. For example, a valid user registers a face image with the facial verification apparatus through the capturing of a registration image, e.g., by the facial verification apparatus, either automatically or upon user control. As non-limiting examples, the processor of the facial verification apparatus may be one or more processors of the facial verification apparatus that control additional operations of the example user terminal, or may be specialized processors specially configured for the face verification, e.g., as a GPU, reconfigurable processor, or specialized neural network or machine learning accelerated processor. When in the verification process of the facial verification apparatus the input image may be referred to as the verification image, while in the registration process of the facial verification apparatus the input image may be referred to as the registration image. In the registration process, the facial verification apparatus extracts features from the face of the valid user and stores the extracted features. The example neural network configuration for extracting features may also be trained previously using training data. When the user registration is completed, and when a verification image is received, the facial verification apparatus may analyze the verification image, extract feature(s) from the face of the user in the verification image, and perform the face verification by comparing the feature(s) extracted from the verification image and feature(s) of the registration image(s) stored in advance based on a verification threshold, for example.

The facial verification apparatus may be configured to perform one or more or all neural network or other machine learning verification trainings, registration operations herein without verification, one or more or all verification operations herein without performing the registration, or may be configured to perform any one or any combinations of the training, registration operations, and verification operations. In an example, one facial verification apparatus may capture a registration image, that facial verification apparatus or another facial verification apparatus may perform image registration, and that facial verification apparatus, the other facial verification apparatus, and/or still another facial verification apparatus may capture the verification image, and any of the facial verification apparatuses or still a further facial verification apparatus may perform the verification of the verification image based on the registered image, e.g., as registered and stored by any of such facial verification apparatuses. Any of the facial verification apparatuses may train the verification model or neural network, or still another facial verification apparatus may perform the training. Such facial verification apparatuses may be in communication and share, or respectively provide from respective storing of the same, any trained parameters, reference images, reference image configurations, any registration image(s), any other image registration information including corresponding extracted features, any verification images, any other verification information including corresponding extracted features, and/or validation results of the verification processes. Thus, though examples below may refer to a facial verification apparatus obtaining a registration image, performing registration, obtaining a verification image, and performing verification as well as additional operations such as the training or other operations, embodiments are not limited to a single facial verification apparatus generating all such data, performing all such operations, or authorizing or implementing further operations or functions of a/the user device based on success or non-success results of the verification.

FIG. 2A is a flowchart illustrating a facial verification method in accordance with one or more embodiments.

Referring to FIG. 2A, in operation 210, a facial verification apparatus obtains, e.g., captures from a camera or image/light sensor of or connected to the computing apparatus, reads from a memory of or connected to the computing apparatus, or otherwise is input or received from a source outside of the computing apparatus, an image. For example, the input image may refer to the image obtained by the facial verification apparatus, which is a target for a facial verification. In an example, the input image may be obtained by an image acquirer or capturer, for example, one or more light or image sensors, digital still cameras, and/or video cameras, such as through a color, black and white, IR, and/or depth image(s) or image information, as non-limiting examples. In an example, the facial verification apparatus is further configured to perform preprocessing on the input image, e.g., before performing feature extraction based on the input image. The preprocessing may include operations to process the input image to be more suitable for the facial verification, e.g., in an expected form for a subsequent extraction model and/or in a form that may increase feature extraction accuracy, as non-limiting examples. The preprocessing may include any one or any two or more or any combination of removing noise included in the input image, increasing a contrast of the input image, deblurring the input image to remove blur from the input image, removing a background region from the input image, performing warping to correct a distortion included in the input image, and performing binarization on the input image, as non-limiting examples. Thus, references to the input image or obtained image may be understood to refer to the input image or obtained image on which image preprocessing has been performed when any of such preprocessing is performed and understood to refer to the input image or obtained image without image preprocessing when such preprocessing is not performed, depending on embodiment.

In operation 215, the facial verification apparatus detects a face area in the input image. The facial verification apparatus detects the face area in the input image by implementing, for example, a Haar-based cascade adaboost classifier, a neural network based classifier, and a support vector machine. However, examples are not limited to the example described in the foregoing, and the facial verification apparatus may detect the face area in the input image using various methods to detect a face area.

In operation 220, the facial verification apparatus normalizes the detected face area. The facial verification apparatus detects facial landmarks from the detected face area and normalizes the face area based on the detected facial landmarks. The facial verification apparatus may detect the facial landmarks in the face area using a landmark detection method based on, for example, an active contour model (ACM), an active shape model (ASM), an active appearance model (AAM), a supervised descent method (SDM), and a neural network, as non-limiting examples. The facial landmarks may refer to feature points in predetermined major facial parts, for example, eyebrows, eyes, a nose, lips, a chin, ears, and/or a facial contour, that can be used to identify the facial parts. Such normalization may include any one or any two or more or any combination an image cropping process that extracts a face image from an input image, a process of matching a location of a facial landmark in the face image to a predefined corresponding reference landmark location, such as with respect to a reference image, and adjusting a size of the face image, as non-limiting examples. In one example, a face image extracted from the input image may be in a form of a patch image. The facial verification apparatus may match determined locations of the facial landmarks to predetermined reference locations, such as by performing an affine transformation on the face area based on the detected facial landmarks. The affine transformation may be performed to map a vector space indicated by the locations of the facial landmarks to another vector space, e.g., corresponding to the reference locations.

In alternative examples, the normalization in operation 220 may not be performed. Thus, with respect in operations 225 through 235, for example, references to the face area may be understood to refer to the face area on which normalization has been performed when any of such normalization is performed and understood to refer to the face area without normalization when such normalization is not performed, depending on embodiment.

In operation 225, the facial verification apparatus generates a plurality of image patches each including at least a portion of the face area based on an image patch set determination criterion. The facial verification apparatus performs the facial verification based on the plurality of image patches instead of a single image patch. Thus, a process of configuring an image patch set which is a set of select image patches to be used for a particular facial verification or multiple image patches is performed. Depending on examples, the facial verification apparatus configures an image patch set based on various determination criteria and generates at least one image patch to be included in the image patch set based on the detected face area. The facial verification apparatus configures image patches corresponding to the face area based on the image patch set determination criterion, and may configure some of the same and/or different image pages corresponding to other face areas based on the image patch set determination criterion.

Hereinafter, an example in which an image patch set determination criterion is a determined detection position of a face area will be described.

When an image patch set determination criterion is a detection position of a face area, the facial verification apparatus configures different image patch sets dependent on the detection position of the face area, i.e., for each of plural different detection positions a different image patch set may be configured. Plural set compositions of image patch sets, each indicating or controlling how the image patch sets are to be respectively configured based on a different detection position of a face area, may be predefined in advance of the underlying verification operation, e.g., by a manufacturer of the facial verification apparatus, a service provider, and/or the user. Thus, the facial verification apparatus generates image patches based on a set composition, from among the predefined set compositions, corresponding to the determined detection position of the face area. For example, when the detection position of the face area corresponds to a predefined first area, the facial verification apparatus generates the image patches based on a first set composition corresponding to the predefined first area, while when the detection position of the face area corresponds to a predefined second area, the facial verification apparatus generates the image patches based on a second set composition corresponding to the predefined second area. Similarly, some of the same and/or other image patches based on other set compositions corresponding to other predefined areas may be generated for other detection positions of the face area.

The facial verification apparatus may determine whether an input face is a full face or a partial face based on the detection position of the face area, for example. When the input face is determined to be the partial face, the facial verification apparatus may verify a shape of the partial face and configure a corresponding image patch set based on a result of the verifying. For example, when the detected face area is determined to include a portion of an edge of the input image, the input face may be verified as being a partial face. Also, when the detected face area is located fully within the edges of the input image, without the input face including or overlapping an edge of the input image, the input face is verified as corresponding to the full face. A type of the partial face may also be estimated or determined based on a determined position of the edge, included in or overlapping the detected face area, with respect to the different potential edges or various portions of the edges of the input image. For example, when the face area includes or overlaps with a portion of an upper edge, the entire upper edge, or an upper portion of the input image including multiple edges of the input image, the input image may be estimated or determined to correspond to a partial face type that does not include or excludes an upper portion of the face, while when the face area includes or overlaps with a portion of a right edge, the entire right edge, or a right portion of the input image including multiple edges of the input image, the input image may be estimated or determined to correspond to another partial face type that does not include or excludes a left portion of a face. Similarly, the input image may be estimated or determined to correspond to any other of plural partial face types depending on the determinations of which portions of different corresponding edges of the input image are included in, or overlapped with, the detected face area.

A detection position of a face area may also, or alternatively, be determined based on a detection result of facial landmarks of the input image. When all landmarks corresponding to predefined facial parts such as eyes, eyebrows, a nose, and a mouth are detected, is the facial verification apparatus may estimate or determine that the detection position of the face area is fully inside or within edges of the input image, representing that the input face is a full face. When a facial landmark corresponding to at least one of the predefined facial parks is not detected in the facial landmark detection, the facial verification apparatus may estimate or determine that the detection position of the face area corresponds to or is a corresponding edge portion of the input image, i.e., corresponding to which facial landmark(s) were not detected or which facial landmark(s) are detected. Thus, when the detection position of the face area is estimated or determined as corresponding to or is the corresponding edge portion of the input image, the detection position of the face area is determined based on an undetected facial landmark or based on which of all facial landmarks are actually detected. For example, when landmarks corresponding to eyebrows and eyes are not detected, the facial verification apparatus may estimate or determine that the face area is detected in an upper side of the input image or that the input face is a partial face excluding an upper portion of a face. Likewise, when landmarks corresponding to lips are not detected, the facial verification apparatus may estimate that the face area is detected in a lower side of the input image or that the input face is a partial face excluding a lower portion of a face.

Thus, different image patch sets may be respectively differently configured based on the detection position of the face area estimated or determined as described above or based on a determined shape of the input face. Also, such select image patches to be used for a particular facial verification are generated based on a corresponding set composition for the image patch set, the corresponding set composition being selected from plural set compositions based on the example determined position of the face area or determined shape of the input face, as described above. The plural set compositions available to be considered when composing the image patch set may include a first image patch corresponding to the entire area of the detected face area, and a second image patch that is a zoomed-in or extended image patch, e.g., in comparison to the first image patch. Also, with the potential zooming-in or the extending of the example second patch image, such zooming-in or extension may also have a different central or focusing position than the first patch image, and such focusing positions of the second image patch may vary based on the detection position of the face area. For example, based on the detection position of the face area, a second image patch may be generated with a zooming-in of a particular eye(s) and eyebrow area(s), while another second image patch may be generated with a zooming-in of the mouth and the nose area.

Hereinafter, an example in which an image patch set determination criterion is whether an occlusion region is determined to be present in a face area will be described.

When an image patch set determination criterion is whether an occlusion region is determined to be present in a face area, the facial verification apparatus may, for a verification of the face area, configure different image patch sets depending on whether an occlusion region is present in the face area and further based on a determined type of the occlusion region in the face area. The occlusion region refers to a region of an input face included in the input image that is occluded by, for example, glasses, sunglasses, a mask, a hat, and/or a hair band. Such an occlusion region may typically hinder an extraction of a unique feature of a user from the input face included in the input image, i.e., because that unique feature would be occluded from extraction, and also typically degrades the accuracy of such typical facial verification operations.

Set compositions of image patch sets indicating how different image patch sets are to be configured, respectively based on whether an occlusion region is determined present and based on a determined type of the occlusion region, may be predefined in advance. Thus, the facial verification apparatus may generate select image patches based on a particular set composition, among the plural predefined set compositions, corresponding to a particularly determined occlusion region detection result. Here, each of the example set compositions may be predefined to correspond to a particular type of occlusion region, and thus depending on which particular type of occlusion region is determined by the facial verification apparatus a different set of image patches may be generated. For example, when the occlusion region is determined present in the face area, the facial verification apparatus may generate the image patches based on one of multiple predefined first set compositions, while when no occlusion region is determined or the occlusion region is determined to be absent in the face area, the facial verification apparatus may generate the image patches based on a predefined second set composition or based on other multiple predefined set compositions dependent on the aforementioned determined detection position of the corresponding face area, or the image patches may be generated based on consideration of both type of occlusion region and the aforementioned determined partial face types of the face area.

When the occlusion region results from a mask, a mouth area may not appear in the input face. Thus, as an example of the generating of the image patches based on one of multiple predefined first set compositions, and with this mask occlusion region example, a select set composition of the image patch set may be previously defined such that the image patches are generated by focusing on an upper portion of the face. When the occlusion region results from sunglasses or glasses, another select set composition of the image patch set may be previously defined such that the image patches are generated by focusing on a lower portion of a face. As such, in a facial verification process, multiple set compositions for respectively different image patch sets may be previously defined such that image patches not including different occlusion regions are generated.

In operation 230, the facial verification apparatus determines a feature value corresponding to a face of a user based on the resulting image patch set including the selectively generated image patches. The facial verification apparatus determines the feature value based on the image patches included in the image patch set and based on select reference image patches that respectively correspond to the image patches. The facial verification apparatus determines the feature value using a feature extractor that may consider differences between the image patches included in the image patch set and the reference image patches respectively corresponding to the image patches. Here, the differences may be determined differences in pixel value between image patches, and may indicate differences in pixel value between the image patches and the reference image patches at positions corresponding to one another. In this example, the reference image patches may be used for mean subtraction of pixel values of the image patches included in the image patch set.

The facial verification apparatus may use, for example, a feature extractor configured as a single neural network, for example, to extract feature values from the image patch set and the set of the reference image patches. Hereinafter, the set of the reference image patches is also referred to as, for example, a reference image patch set. For example, the feature extractor may receive differences between the image patches and reference image patches corresponding to the image patches as inputs and may output a feature vector as a feature value.

The feature extractor is, for example, a neural network trained to output feature values corresponding to differences between image patches of image patch sets and corresponding reference image patches. As discussed further below with respect to FIG. 11, in a training process of the feature extractor, the feature extractor receives differences between training image patches for training the feature extractor and corresponding reference image patches as inputs and outputs a feature value. As also discussed further below, such as in the example of the feature extractor being implemented by a neural network or other machine learning model, the feature extractor may be trained by calculating an example loss due to a difference between the output feature value and a previously determined desired feature value, and by adjusting parameters of or included in the feature extractor to reduce the example loss. The parameters of the feature extractor may be appropriately adjusted by repetitively performing such processes on a number of training image patches, e.g., through multiple runs of the training image patches and corresponding repetitive adjustments of the parameters.

A particular reference image patch corresponding a training patch image may be determined based on the training image patches used to train the feature extractor. For example, respective reference image patches may be, for example, based on a mean image or a mean value image of the training image patches, e.g., corresponding to the aforementioned sets of the reference image patches. Such mean images may be generated by averaging pixel values at corresponding positions between the training image patches, for example. A mean value image may be generated by averaging pixel values of overall pixels included in the training image patches and allocating a mean pixel value to the overall pixels. In the mean image, because the pixel values will typically vary dependent on the respective pixel positions, and though the mean image is an averaging of respective pixels a facial form may still be represented or shown. Rather, in the mean value image, all pixels may have the same pixel value and thus, such a facial form may not be represented or shown. As an example, a mean of all pixel values may ultimately reflect a mean skin color. A form of the reference image patch is not limited to the foregoing examples and thus, the reference image patches may be provided in various forms. For example, a reference image patch may be a color image patch having one color irrespective or independent of the training image patches.

The reference image patches considered by the extractor for extracting the feature value may vary based on the aforementioned image patch set determination criterion. For example, respective reference image patches may be determined based on any one or any two or more or any combination of, for example, a detection position of a face area, whether an occlusion region is present in the face area, a facial expression appearing in the face area, user information estimated based on the face area, an illumination state of an input image, and an image quality of the input image. Each image patch set determination criterion has particular sets of reference image patches corresponding to the image patch set determination criterion, and thus the reference image patches to be considered for extracting a feature value are selected from all reference image patches based on the image patch set determination criterion determined for use in the facial verification of the input image.

In addition to the image patches generated in operation 225, the image patch set may include an additional image patch corresponding to the image patch set determination criterion, and the facial verification apparatus may determine a feature value based on the image patches and the additional image patch. The additional image patch may be used to provide information associated with the image patch set determination criterion. For example, when the image patch set determination criterion is a detection position of a face area, the additional image patch may be used to indicate the detection position of the face area. For example, when the face area is detected at a right side of an input image, an additional image patch indicating that the face area is detected at the right side may be used. Additional image patches corresponding to detection positions of the face area may be provided in advance, e.g., with an additional image patch corresponding to a detection position of the face area being selected from the provided/available additional image patches. Information on a difference between an image patch set including the image patches generated in operation 225 and the additional image patch and a reference image patch set corresponding to the image patch set may be input to the feature extractor, and the feature extractor may generate or output a feature value corresponding to the input information on the difference.

In operation 235, the facial verification apparatus determines whether the facial verification is successful based on the feature value determined in operation 230. The facial verification apparatus determines whether the facial verification succeeds based on a comparison result between the feature value extracted by the feature extractor and a registered feature value determined in a face registration process of the facial verification apparatus. The registered feature value is a feature value of a valid user registered in the face registration process. In the face registration process, a registered feature value corresponding to each of plural image patch sets, respectively corresponding any or all of the image patch set determination criteria discussed above, may be registered. Among the pre-registered feature values, the facial verification apparatus may compare a registered feature value corresponding to the image patch set determination criterion selected with respect to operation 225 to the feature value extracted by the feature extractor in operation 230 and determine whether the facial verification succeeds based on result of that comparison. For example, the facial verification apparatus may determine a similarity between the registered feature value and the extracted feature value. When the similarity meets, e.g., is greater than, a predetermined threshold, the facial verification apparatus determines that the facial verification is successful. When the similarity fails to meet, e.g., is less than or equal to, the threshold, the facial verification apparatus determines that the facial verification has failed. For example, as a difference between the registered feature value and the extracted feature value deceases, the similarity increases, and as the difference increases, the similarity decreases.

Figure 2B:
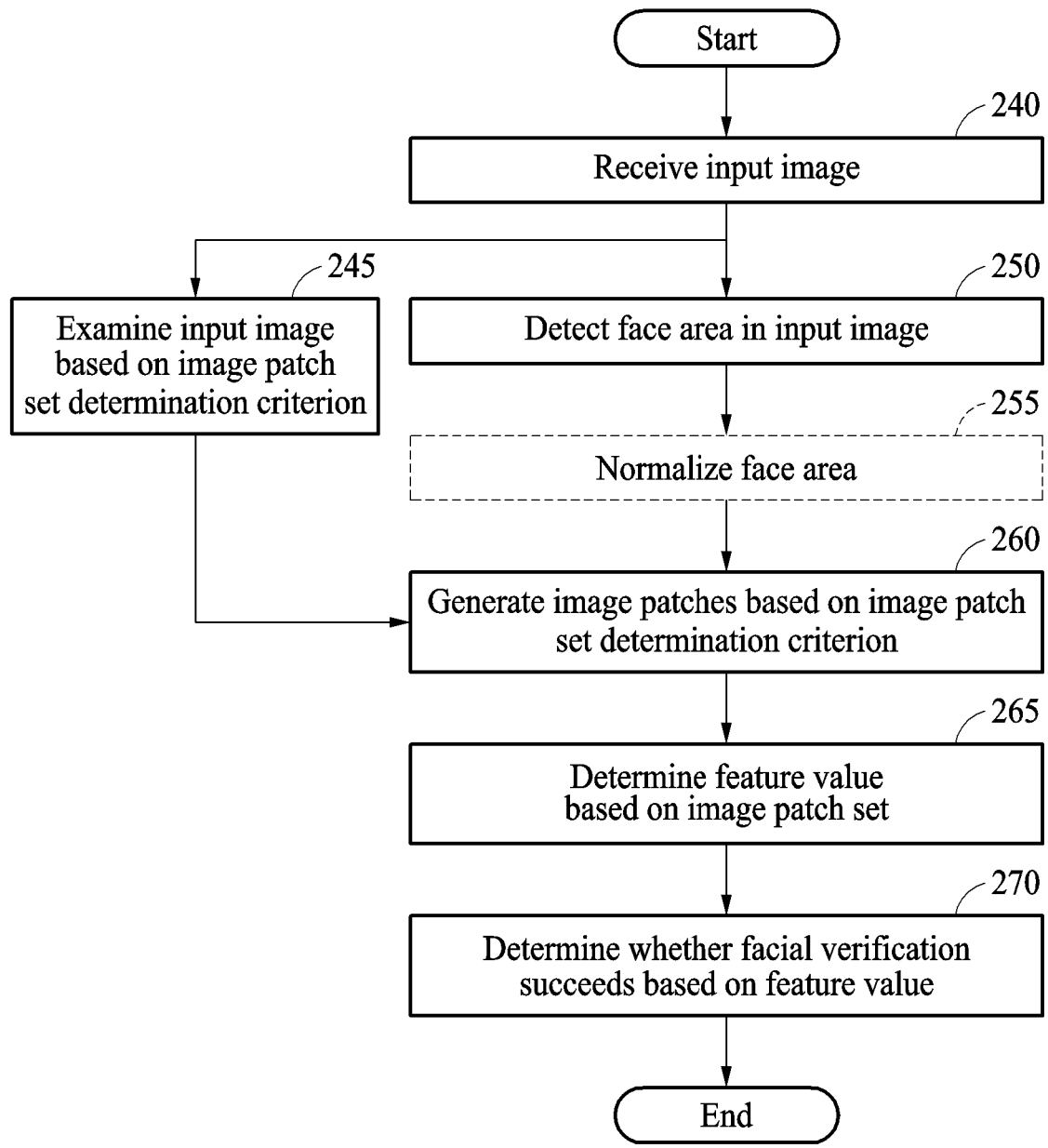
FIG. 2B illustrates an example of a facial verification method in accordance with one or more embodiments.

FIG. 2B is a flowchart illustrating another example of the facial verification method in accordance with one or more embodiments. Descriptions of FIG. 2A are also applicable to an example of FIG. 2B, and thus example references to FIG. 2A are included below with respect to FIG. 2B, with further repeated description thereof with respect to FIG. 2A being omitted merely for brevity purposes. Also, though examples are provided demonstrating the applicability of operations of FIG. 2A to operations of FIG. 2B, examples are also not limited thereto.

Referring to FIG. 2B, in operation 240, the facial verification apparatus obtains, e.g., captures, reads, or receives, an input image used for a facial verification operation or implementation. In an example, the facial verification apparatus is configured to perform preprocessing on the obtained input image, such as described with reference to operation 210 of FIG. 2A.

In operation 245, the facial verification apparatus examines the input image based on an image patch set determination criterion. The facial verification apparatus examines any one or any combination of a detection position of a face area, an occlusion region in the face area, for example, due to a mask or glasses, a facial expression appearing in the face area, user information, for example, a gender or an age, an illumination state of the input image, and an image quality, for example, a degree of blurriness of the input image. The aforementioned examination items may be examined using an image quality assessment (IQA) or neural network(s) trained for a purpose of the corresponding examination, for example.

In operation 250, the facial verification apparatus detects for a face area in the input image, and may thereby determine the detected face area. In operation 255, the facial verification apparatus normalizes the face area. Alternatively, in another example, the normalization of operation 255 may not be performed. In operation 260, the facial verification apparatus generates image patches based on a result of the examination of the input image performed in operation 245, and configures an image patch set to be used for the facial verification. For example, the facial verification apparatus may configure the image patch set based on the detection position of the face area and/or configures an image patch set corresponding to a determined presence of an occlusion region when it is determined that the occlusion region is present in the face area.

In operation 265, the facial verification apparatus determines a feature value corresponding to the face of a user based on the image patch set. The facial verification apparatus determines the feature value using a feature extractor that considers differences between the image patches included in the image patch set and select reference image patches corresponding to the image patches. For example, after the differences are determined by the facial verification apparatus, the result of that determination may be input to the feature extractor. In this example, as discussed above with respect to FIG. 2A, the reference image patches may vary depending on the image patch set determination criterion. When the image patch set corresponding to the presence of the occlusion region is determined, for example, reference image patches corresponding to the presence of the occlusion region are used. In addition, when it is determined that the input image has a blurriness greater than or equal to a threshold, predefined reference image patches corresponding to the blurriness may be used in the determining of the feature value by the feature extractor. Also, when a facial expression appearing in the input image is determined to be a smile face, e.g., compared to other determinable facial expression faces, in operation 245, predefined reference image patches corresponding to the example smile face may be used in the determining of the feature value by the feature extractor. Here, with respect to the example predefined reference image patches corresponding the smile face, the reference image patches may be, for example, a mean image of training image patches corresponding to such a smile face among training image patches used to train the feature extractor.

In operation 270, the facial verification apparatus determines whether the facial verification is successful based on the feature value determined in operation 265. For example, the facial verification apparatus may determine that the facial verification is successful when the feature value satisfies a preset condition and may determine that the facial verification has failed when the feature value does not satisfy the condition. Depending on the determination result of whether the facial verification is successful or unsuccessful, the facial verification apparatus may further indicate the determination result of the facial verification, such as explicitly or implicitly as further discussed herein.

Figure 3A:
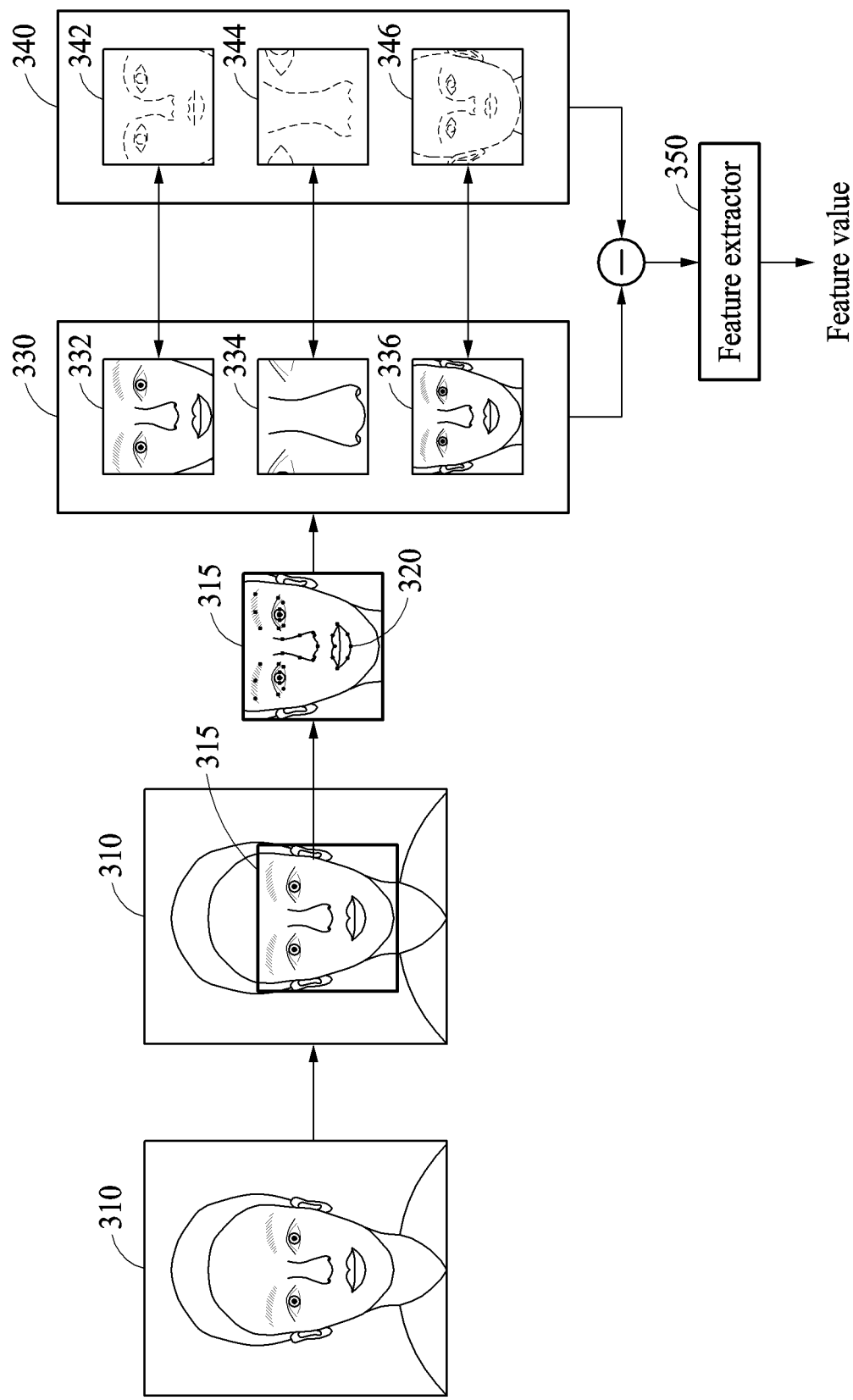
Figure 3B:
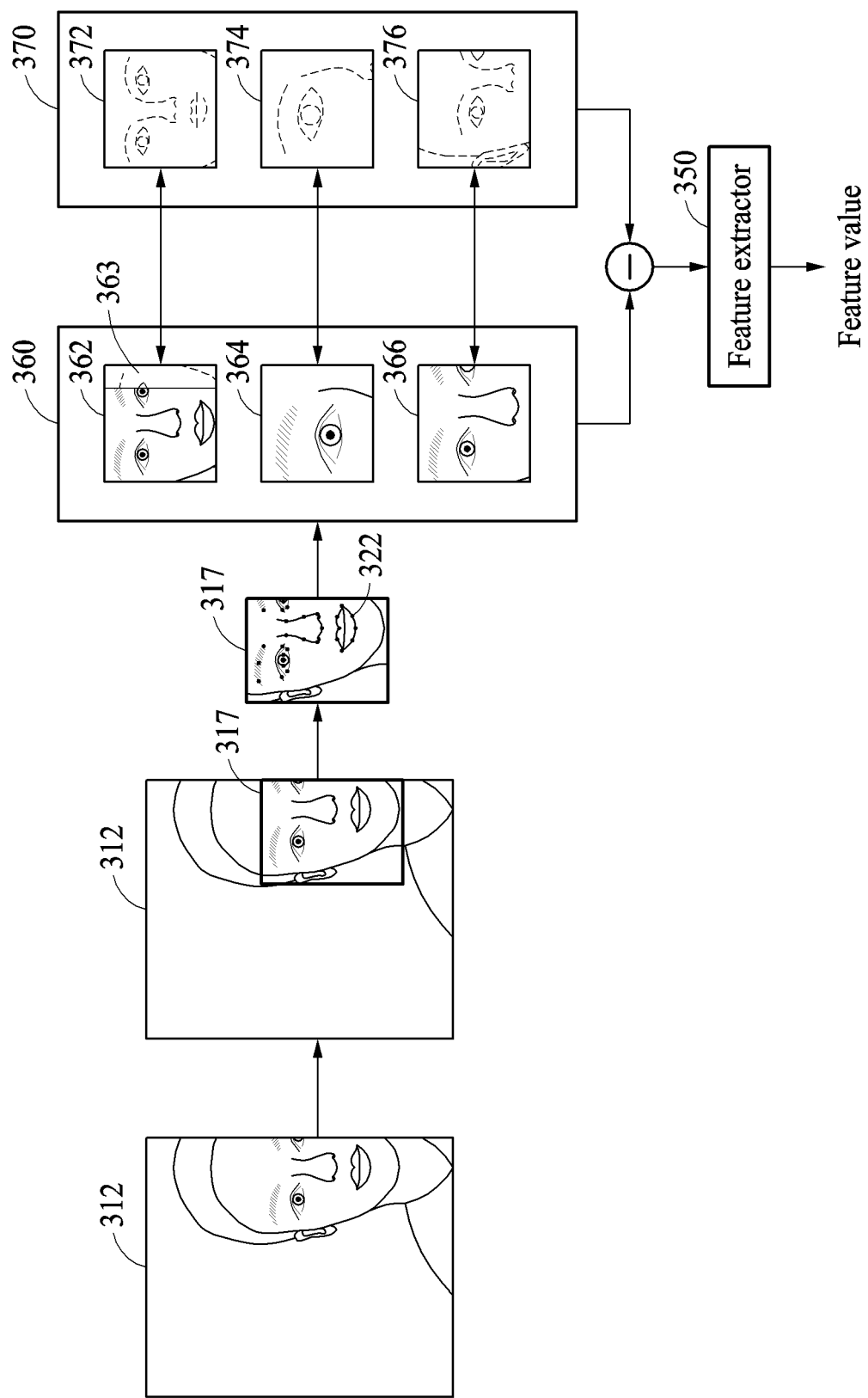

FIGS. 3A through 3C illustrate examples of configuring an image patch set based on a detection position of a face area and determining a feature value, in accordance with varying embodiments.

FIG. 3A illustrates a case in which a full face is detected by the facial verification apparatus, including a detection position of a face area 315 being determined to be inside of the edges of an input image 310, also referred herein as being at an inside of the input image 310. When the face area 315 is being detected, the facial verification apparatus may detect for facial landmarks, and an example landmark 320 may be detected in the face area 315. Based on the detected face area 315, a plurality of image patches 332, 334, and 336 may be generated through image transformation, for example, an image normalization or an affine transformation based on or using the detected facial landmarks. The image patches 332, 334, and 336 are configured into an image patch set 330. Different image patches may be generated in various forms dependent on respectively determined detection position of the face area. Thus, in the example of FIG. 3A, when the detection position of the face area 315 is at the inside of the input image 310, the image patch 332 is generated by zooming in a full area of the face area 315, the image patch 334 generated by zooming in a nose area of the face area 315, and the image patch 336 including the full area of the face area 315 is provided or generated. Thus, the image patch set 330 includes the image patch 336 corresponding to the full area of the face area 315 and the image patches corresponding to partial areas of the face area 315. As such, by using various forms of image patches, a facial verification accuracy may be improved.

After the image patches 332, 334, and 336 are generated, a reference image patch set 340 including reference image patches 342, 344, and 346 corresponding to the image patches 332, 334, and 336 is determined. The reference image patches 342, 344, and 346 are also determined or selected based on the detection position of the face area 315. Various such reference image patches may be previously generated and stored, and the facial verification apparatus may select the reference image patches to be included in a reference image patch set from the stored reference image patches based on the corresponding image patch set determination criterion of the image patch set 330. The reference image patches 342, 344, and 346 may include, for example, a mean value image or a mean image of training image patches used to train a feature extractor 350. Forms of the reference image patches 342, 344, and 346 may respectively correspond to the respective forms of the image patches 332, 334, and 336. For example, the reference image patch 342 corresponding to the image patch 332 may have a form obtained by zooming in a face area in a mean image or a mean value image. Also, the reference image patch 344 corresponding to the image patch 334 may have a form obtained by zooming in a nose area in the mean image or the mean value image.

Determined differences between the image patches 332, 334, and 336 and the reference image patches 342, 344, and 346 may then be input to the feature extractor 350, and the feature extractor 350 may generate a feature value corresponding to a face of a user based on the input differences. In this example, the differences between the image patches 332, 334, and 336 and the reference image patches 342, 344, and 346 may be input to the feature extractor 350 in a form in which the differences are concatenated with one another.

FIG. 3B illustrates a case in which only a portion of a face excluding a left portion of the face is detected and a detection position of a face area 317 is thus the right side of the input image 312. For example, after the face area 317 is detected in the input image 312, facial landmarks including a landmark 322 may be detected in the face area 317. A plurality of image patches 362, 364, and 366 may then be generated by performing an affine transformation based on positions of the facial landmarks based on detected position of the face area 317 and detected facial landmarks, for example. Also, the generated image patches 362, 364, and 366 are configured into an image patch set 360. In this example, the form of the image patches 362, 364, and 366 correspond to the detection position of the face area 317. As illustrated in FIG. 3B, when the detection position of the face area 317 is the right side, the image patch 362 is generated by zooming in a full area of the face area 317, and the image patches 364 and 366 are generated by zooming in an eye and nose area of the face area 317 at respectively different rates. In terms of the image patch 362, a face area 363 of the full face area not shown in the input image 312 may be synthesized or filled with other data, for example, image pixel values from the reference image patch 372 corresponding to the image patch 362. The facial verification apparatus may thus generate the image patch 362 by combining image information appearing in the face area 317 of the full face and image information of an area corresponding to the image area 363 in the reference image patch 372. Here, the image information of the reference image patch 372 used to generate the image patch 362 is image information that was not included in a partial face of the face area 317.

When the example image patches 362, 364, and 366 are generated, the reference image patch set 370 including the respective reference image patch 372, a reference image patch 374, and a reference image patch 376 corresponding to the image patches 362, 364, and 366 are determined. Forms of the reference image patches 372, 374, and 376 correspond to the respective forms of the image patches 362, 364, and 366. For example, the reference image patch 372 has a form of a full face, the reference image patch 374 has a form of a zoomed in image of an eye and the nose, and the reference image patch 376 has another form of the zoomed in image of the eye and the nose with a different rate of zooming in compared to the zoomed in rate of the reference image patch 374. Differences between the image patches 362, 364, and 366 and the reference image patches 372, 374, and 376 may be determined, and the determined differences may be input to the feature extractor 350. The feature extractor 350 may then generate feature value(s) corresponding to the determined differences.

FIG. 3C illustrates a case in which only a portion of a face excluding a lower portion of the face is detected and a detection position of a face area 316 is thus the lower side of the input image 314. For example, the face area 316 and facial landmarks including a landmark 324 are detected from the input image, and then a plurality of image patches 382, 384, and 386 corresponding to the detection position of the face area 316 are generated based on position of the detected facial landmarks, for example. The generated image patches 382, 384, and 386 are configured into an image patch set 380. As illustrated in FIG. 3C, when the detection position of the face area 316 is the lower side, the image patch 382 is generated by zooming in a full area of the face area 316, the image patch 384 is generated by zooming in a nose area of the face area 316, and the image patch 386 corresponding to a full face area is generated. In the image patch 386, a face area 388 of the full face area not included in the input image 314 may be synthesized or filled with other data, for example, image information of a reference image patch 396 corresponding to the image patch 386.

When the example image patches 382, 384, and 386 are generated, the reference image patch set 390 including the respective reference image patch 392, a reference image patch 394, and the reference image patch 396 corresponding to the image patches 382, 384, and 386 are determined. Forms of the reference image patches 392, 394, and 396 correspond to the respective forms of the image patches 382, 384, and 386. For example, the reference image patch 392 has a zoomed in form of a full face, the reference image patch 394 has a zoomed in form of an eye and the nose, and the reference image patch 396 has a form of a full face. Differences between the image patches 382, 384, and 386 and the reference image patches 392, 394, and 396 may then be determined, and the determined differences may be input to the feature extractor 350. The feature extractor 350 may then generate feature value(s) corresponding to the determined differences.

As such, respective set compositions of image patch sets used to perform facial verification may vary dependent on differently detected positions of face areas in input image. Through this, even when the facial verification is performed on a partial face, the face verification may be more accurately performed without degradation in the facial verification accuracy compared to typical technological approaches. As non-limiting examples, Table 1 below demonstrates several different set compositions for image patch sets based on different detection positions of a face area. Though the example of Table 1 demonstrates image patch sets that each include three image patches, the number of image patches included in an image patch set is not limited thereto and may vary in different examples.

TABLE 1

| Detection position of face area | Composition of image patch set |
|---|---|
| Inside | Zoom-in image patch of full area of face area, Zoom-in image patch of nose area of face area, Image patch including full area of face area appear |
| Left side | Zoom-in image patch of full area of face area, Zoom-in image patches of eye and nose area of face area in different rates |
| Right side | Zoom-in image patch of full area of face area, Zoom-in image patches of eye and nose area of face area in different rates |
| Upper side | Zoom-in image patch of full area of face area, Zoom-in image patch of nose area of face area, Image patch corresponding to full face area |
| Lower side | Zoom-in image patch of full area of face area, Zoom-in image patch of nose area of face area, Image patch corresponding to full face area |

In an alternate example, a set composition of an image patch set corresponding to a case in which a detection position of a face area is a right side may not be provided separately from an image patch set corresponding to a case in which the detection positon of the face area is the left side. Rather, when a position of the face area detected in an input image is a right side, the face area may merely be adjusted to correspond to a face area detected from a left side through a left-and-right reversal image processing, and thus the image patch set for the face area detected from the right side may be used through, or further generated based on, an image reversal of the image patch set for the face area detected from the left side. An example set composition of a reference image patch set corresponding to the set composition of the image patch set in Table 1 will be described with reference to FIG. 4.

Figure 4:
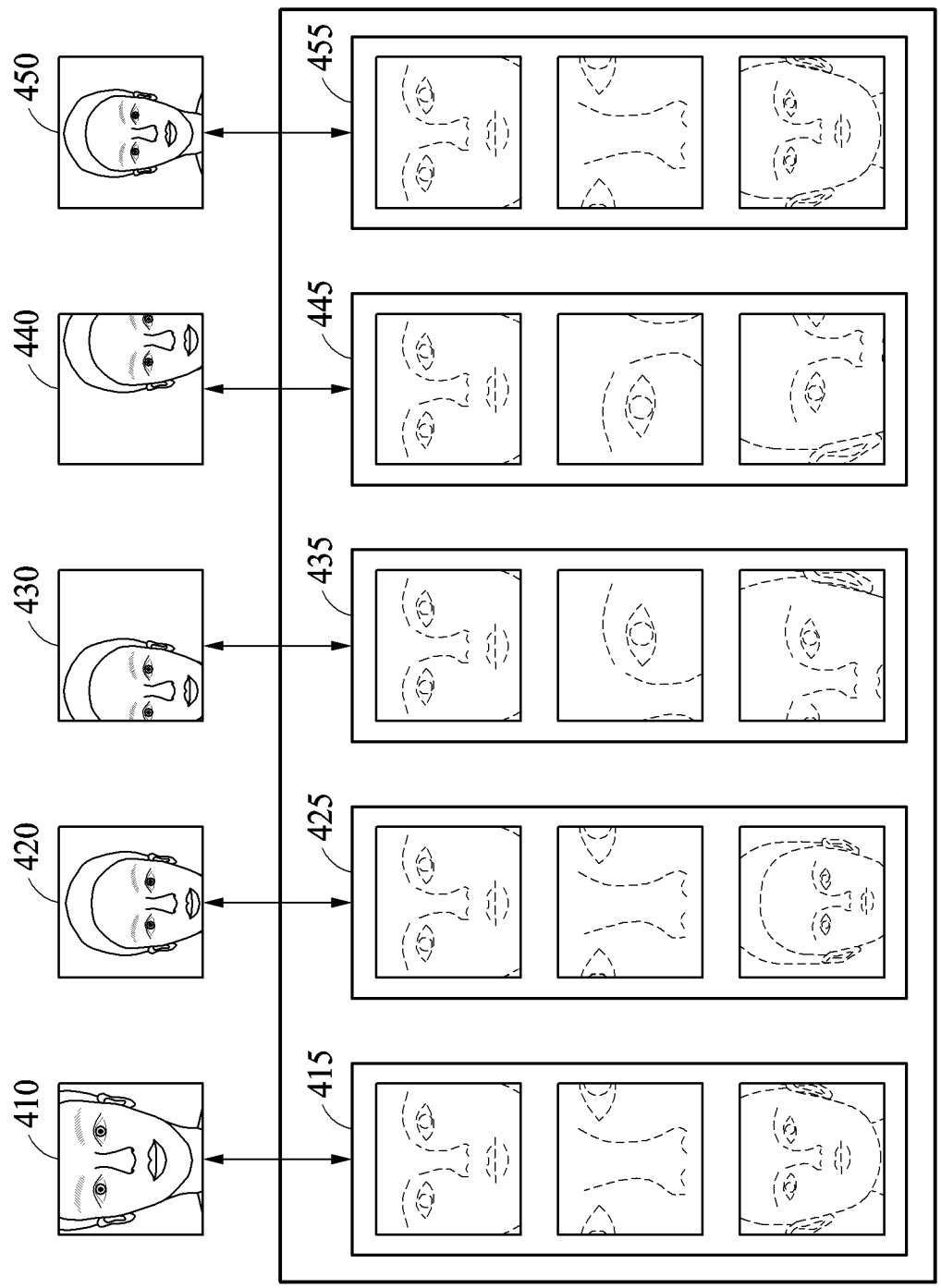
FIG. 4 illustrates an example of sets of reference image patches corresponding to a detection position of a face area, in accordance with one or more embodiments.

FIG. 4 illustrates an example of sets of reference image patches corresponding to different detection positions of a face area, in accordance with one or more embodiments. Respective set compositions of reference image patch sets may vary based on the detection position of a face area. Referring to FIG. 4, reference image patch sets 415, 425, 435, 445, and 455 may be previously generated and determined as corresponding to respective detection positions of an upper side 410, a lower side 420, a left side 430, a right side 440, and an inner side 450 of a face area in an input image. As noted, the compositions of the reference image patch sets based on the different potential detection positions of a face area may be previously defined for subsequent selective use during verification operations for corresponding differently determined positions of face areas in different input images. Thus, among the predefined reference image patch sets, a select reference image patch set corresponding to a current detection position of a face area for an input image may be used in the corresponding verification operation to determine a feature value for the input image. Forms of the set compositions of the reference image patch sets 415, 425, 435, 445, and 455 may be similar to or even identical to the forms of the set compositions of the image patch sets as shown in Table 1. For example, when the detection position of a face area of an input image is the lower side 420, the reference image patch set 425 may be selected and then used in the determining of the feature value for the corresponding verification operation of the input image, with the reference patch set 425 including a reference image patch obtained by zooming in a full area of the face area, a reference image patch obtained by zooming in a nose area of the face area, and a reference image patch corresponding to a full face area.

Figure 5A:
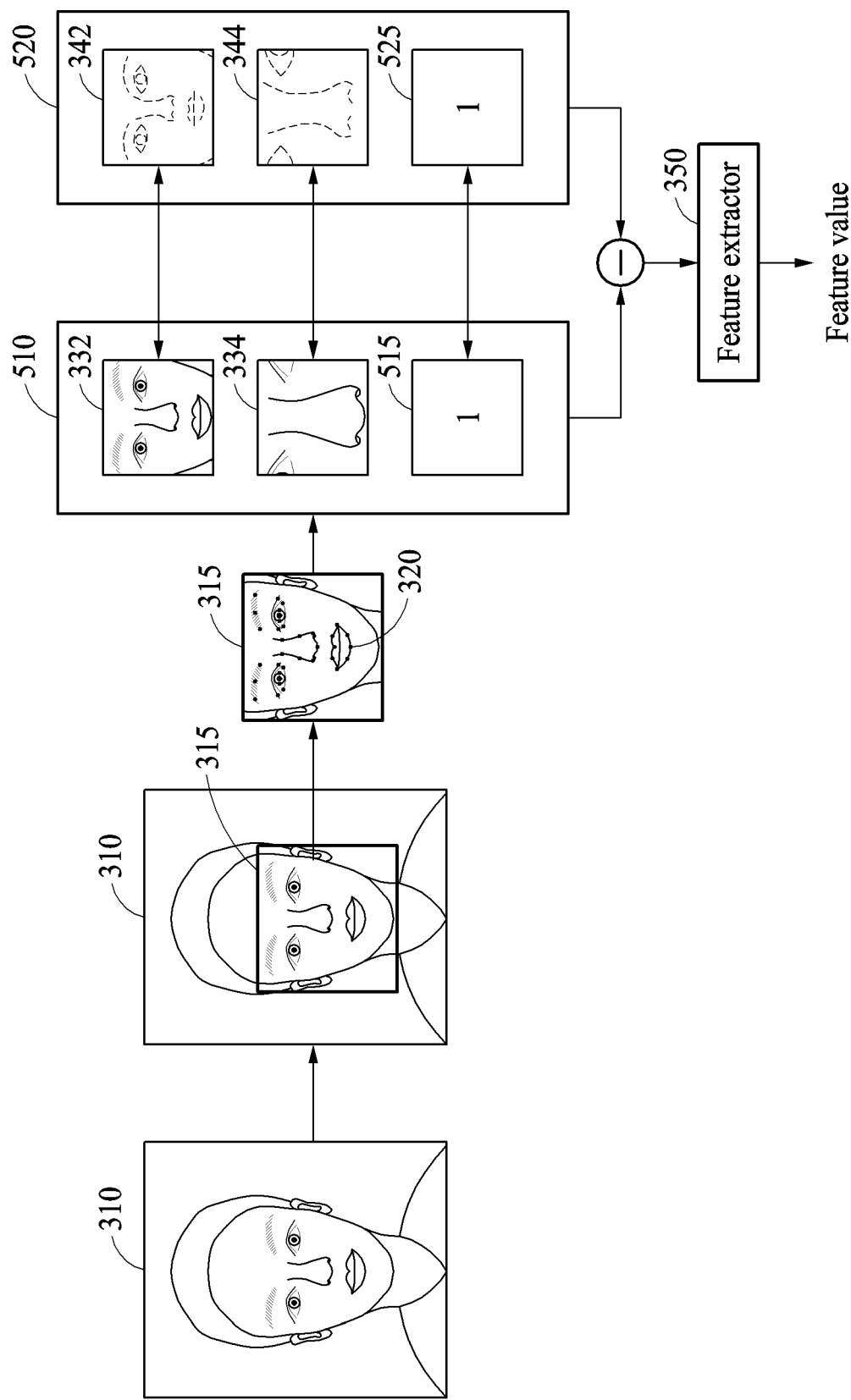
FIGS. 5A and 5B illustrate examples of configuring an image patch set based on a detection position of a face area and determining a feature value, in accordance with varying embodiments.
Figure 5B:
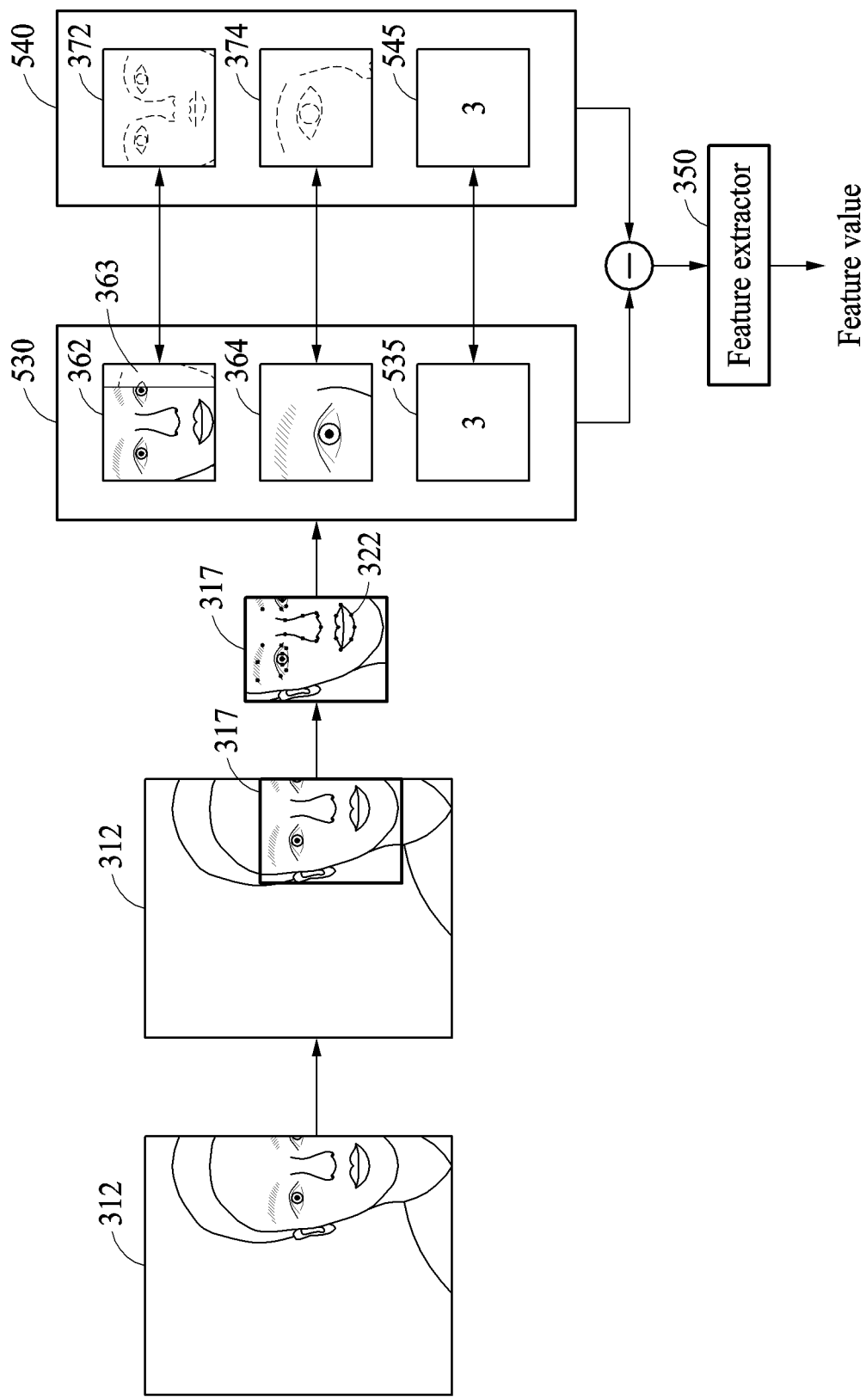

FIGS. 5A and 5B illustrate examples of configuring an image patch set based on a detection position of a face area and determining a feature value, in accordance with varying embodiments.

FIG. 5A illustrates a case in which a full face is detected by the facial verification apparatus, e.g., including a detection position of the face area 315 being determined similarly as in the input image 310 in the example of FIG. 3A, for example. An image patch set 510 may, thus, include the image patches 332 and 334 such as generated based on the face area 315, and may further include an additional image patch 515 corresponding to the corresponding image patch set determination criterion. By considering the additional image patch 515, the example feature extractor 350 may thereby be provided information that indicates a detection position of the face area 315, i.e., differently from other predefined additional image patches that could be used to indicate other detection positions as discussed further below with respect to FIGS. 5B and 5C. Thus, in the example of FIG. 5A, with the detection position of the face area 315 being at an inside of the input image 310, the additional image patch 515 may be selected, from among such predefined additional image patches, for inclusion in the image patch set 510 and thereby used to indicate to the extractor 350 that the detection position of the face area is at the inside of the input image.

Thereafter, a reference image patch set 520 corresponding to the image patch set 510 may be obtained, provided, or configured. In an example, such reference patches of the reference patch set 520 may have previously been generated and determined as corresponding to the detected position of the face area or as corresponding to the determined composition of the image patch set 510. Similar to FIG. 3A, the reference image patch set 520 may include the reference image patch 342 corresponding to the image patch 332, and the reference image patch 344 corresponding to the image patch 334. The reference image patch set 520 further may include a reference image patch 525 corresponding to the additional image patch 515, i.e., predetermined to correspond to the form of the additional image patch 515. In an example, the reference image patch 525 may be identical to, for example, the additional image patch 515. Differences between the image patch 332, the image patch 334, and the additional image patch 515 and the reference image patches 342, 344, and 525 corresponding to the image patch 332, the image patch 334, and the additional image patch 515 may then be determined, and the resulting differences input to the feature extractor 350. The feature extractor 350 may then generate feature value(s) based on the input differences input.

FIG. 5B illustrates a case in which only a portion of a face excluding a left portion of the face is detected and a detection position of a face area of an input image determined. Here, similar to the above discussion of FIG. 5A, the example of FIG. 5B will be discussed using the face area 317 of the input image 312 of FIG. 3B, where the face area 317 is determined to be the right side of the example input image 312. In the example of FIG. 5B, though, while the image patch set 530 may include the image patches 362 and 364 generated based on the face area 317 as discussed above with respect to FIG. 3B, the image patch set 530 may further include an additional image patch 535 corresponding to a corresponding image patch set determination criterion. The additional image patch 535 may be in the image patch set 530 to indicate to the feature extractor 350 that the detection position of the face area is the right side, so such information may be considered during the extraction of feature values for the input image 312. Similar to FIG. 3B, the reference image patch set 540 corresponding to the image patch set 530 may include the reference image patch 372 corresponding to the image patch 362, and the reference image patch 374 corresponding to the image patch 364. In addition, the reference image patch set 540 may include a reference image patch 545 corresponding to the additional image patch 535. In an example, the reference image patch 535 may be identical to, for example, the additional image patch 545. Differences between the image patch 362, the image patch 364, and the additional image patch 535 and the reference image patches 372, 374, and 545 corresponding to the image patch 362, the image patch 364, and the additional image patch 535 may be determined, and the differences may be input to the feature extractor 350. The feature extractor 350 may then generate feature value(s) based on the input differences.

As such, respective set compositions of image patch sets used to perform facial verification may vary dependent on differently detected positions of face areas in input images, and varied to include different additional image patches based on the different detected positions. Through this, even when the facial verification is performed on a partial face, the face verification may be more accurately performed without degradation in the facial verification accuracy compared to typical technological approaches. As non-limiting examples, Table 2 below demonstrates several different set compositions for image patch sets based on different detection positions of a face area. Though the example of Table 2 demonstrates image patch sets that each include three image patches, the number of image patches included in an image patch set is not limited thereto an may vary in different examples.

TABLE 2

| Detection position of face area | Composition of image patch set |
|---|---|
| Inside | Zoom-in image patch of full area of face area, Zoom-in image patch of nose area of face area, First additional image patch |
| Left side | Zoom-in image patches of eye and nose area of face area in different rates Second additional image patch |
| Right side | Zoom-in image patches of eye and nose area of face area in different rates Third additional image patch |
| Upper side | Zoom-in image patch of full area of face area, Zoom-in image patch of nose area of face area, Fourth additional image patch |
| Lower side | Zoom-in image patch of full area of face area, Zoom-in image patch of nose area of face area, Fifth additional image patch |

In Table 2, the First additional image patch through the Fifth additional image patch are each additional image patches that are distinguished from one another based on different face area detection positions. Each additional image patch may respectively be, for example, different image patches having respective preset pixel values in their full areas. However, embodiments are not limited to the foregoing example, and the additional image patches may be provided in various forms. A set composition of respective reference image patch sets corresponding to the set compositions of the image patch sets in Table 2 will be described with reference to FIG. 6.

Figure 6:
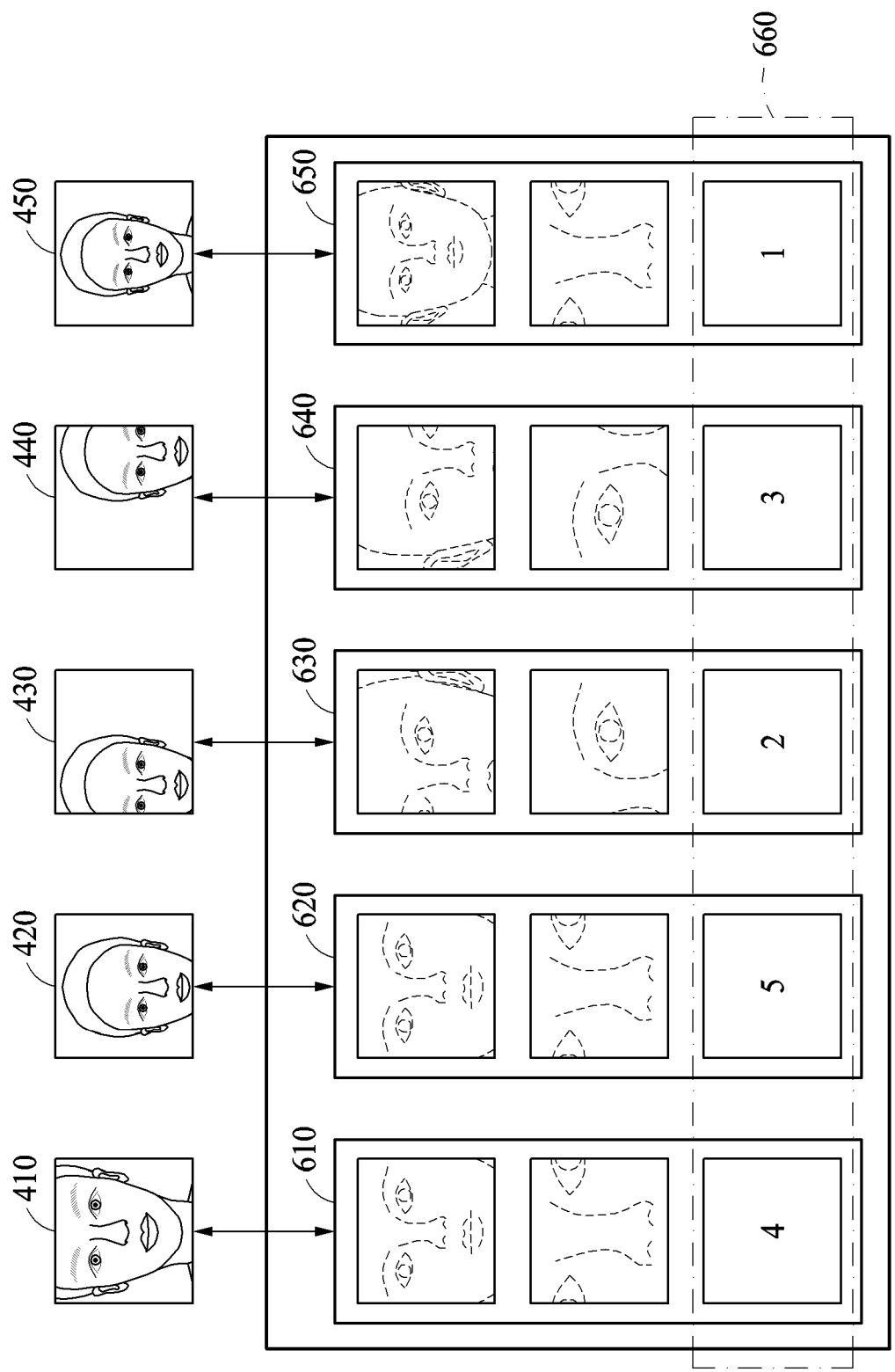
FIG. 6 illustrates an example of sets of reference image patches corresponding to a detection position of a face area, in accordance with one or more embodiments.

FIG. 6 illustrates an example of sets of reference image patches corresponding to different detection positions of a face area, in accordance with one or more embodiments. Respective set compositions of reference image patch sets may vary based on the detection position of a face area. Referring to FIG. 6, reference image patch sets 610, 620, 630, 640, and 650, each including reference image patches corresponding thereto, may be previously generated and determined as corresponding to respective detection positions of the upper side 410, the lower side 420, the left side 430, the right side 440, and the inner side 450 of a face area in an input image. In this example, each of the reference image patches may include different reference image patches 660, each corresponding to different detection positions of a face area and respectively corresponding to the aforementioned different additional image patches. For example, when the detection position of the face area is the lower side 420, the reference image patch set 620 includes a reference image patch obtained by zooming in a full face area, a reference image patch obtained by zooming in a nose area of the face area, and a reference image patch of the detection position of the face area corresponding to a lower side.

Figure 7:
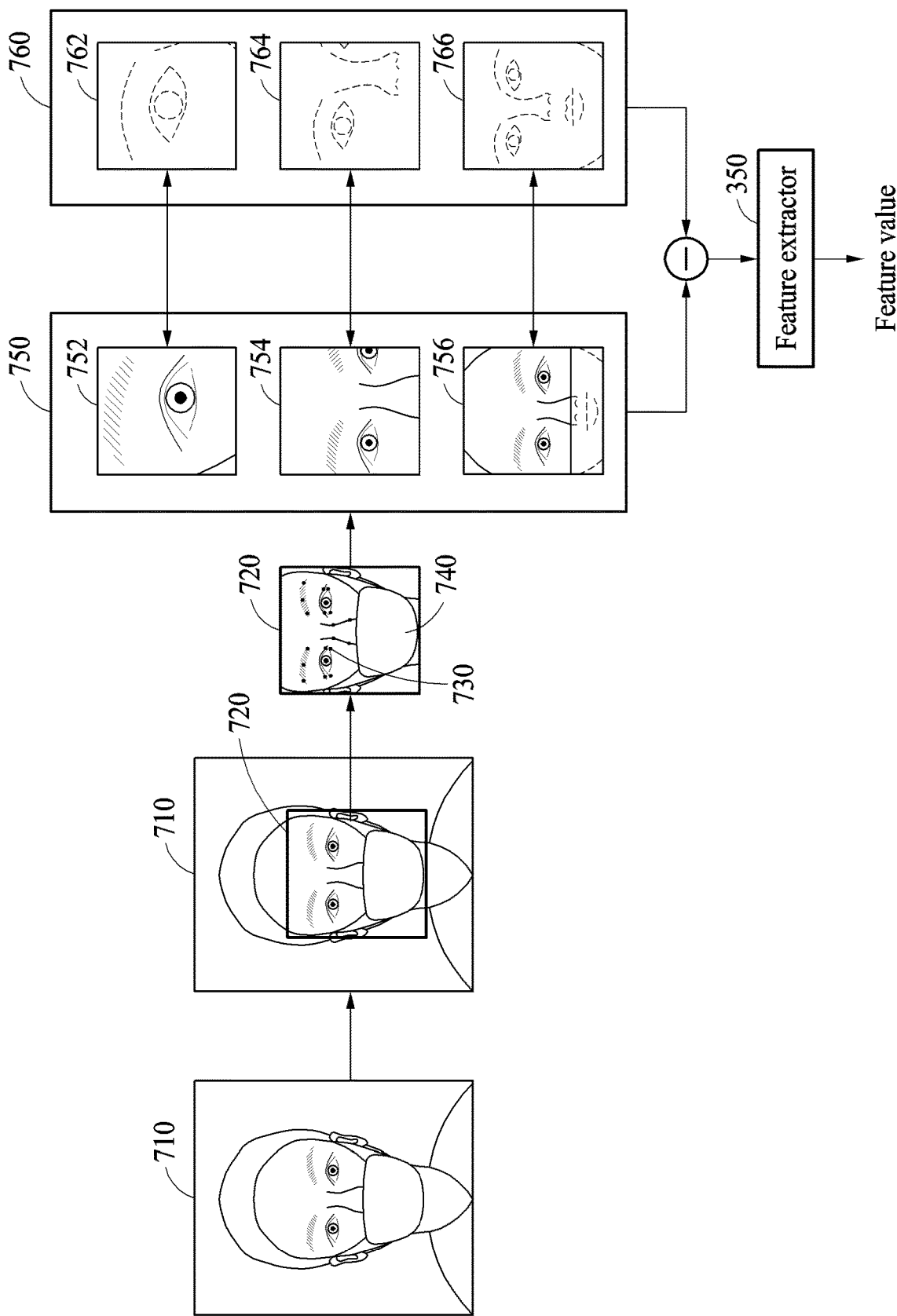
FIG. 7 illustrates an example of configuring an image patch set based on whether an occlusion region is present and determining a feature value, in accordance with one or more embodiments.

FIG. 7 illustrates an example of configuring an image patch set based on whether an occlusion region is present and determining a feature value, in accordance with one or more embodiments.

Referring to FIG. 7, a face area 720 includes an occlusion region due to a mask 740, as an example occlusion. The face area 720 is detected from an input image 710, and the facial verification apparatus may determine whether the face area 720 includes any such occlusion region due to a mask, sunglasses, glasses, hat, and/or hairband, as non-limiting examples. For example, when the facial verification apparatus detects for facial landmarks, a landmark 730 may be detected in the face area, and the facial verification apparatus may then determine whether an occlusion is present, i.e., that the mask 740 is present, based on a detection result of the facial landmarks. For example, when the face area 720 is determined to be at an inside of the input image 710, and landmarks corresponding to a mouth area are not detected, the facial verification apparatus may determine that the mask 740 is present. Also, whether the face area 720 includes the occlusion region due to the example mask 740 may alternatively be determined using a separate verifier configured to verify whether an occlusion region is present. For example, the separate verifier may be implemented through a trained neural network or otherwise machine learning model.

When it is determined that the occlusion region is present in the face area 720, an image patch set 750 is configured based on a corresponding predefined set composition, predefined for such a situation of the determined full face with mask occlusion. For example, when it is determined that the mask 740 is present, the facial verification apparatus may generate the image patch set by generating a zoom-in image patch 752 of an eye area, a zoom-in image patch 754 of an eye and nose area, and an image patch 756 corresponding to a full face, e.g., instead of an image patch related to the mouth area. In this example, the image patch 756 may be generated by synthesizing or filling a face area corresponding to the mouth area occluded by the mask 740 with other data, for example, with image information of a reference image patch 766 corresponding to the image patch 756. A reference image patch set 760 including reference image patches 762, 764, and 766 corresponding to the zoom-in image patch 752, the zoom-in image patch 754, and the image patch 756 may also be selected, based on the determination of the determined location and occlusion presence. Differences between the reference image patches 762, 764, and 766, and the zoom-in image patch 752, the zoom-in image patch 754, and the image patch 756 may then be determined, and the differences input to the feature extractor 350. The feature extractor 350 may generate feature value(s) corresponding to a face of a user based on the input differences.

Likewise, when it is determined that the face area 720 includes other occlusion regions, e.g., due to sunglasses or glasses, the image patches may be differently generated to focus on different facial parts, for example, corresponding image patches of such other corresponding image patch sets may focus on a nose and a mouth instead of the eye area as generated in the image patch set 750. When it is determined that an occlusion region is absent in the face area 720, an image patch set may be configured based on the detection position of the face area as described with reference to FIGS. 3A through 3C. As such, the facial verification apparatus may determine whether an occlusion region is present in a face area, and dependent on that determination the facial verification apparatus may perform facial verification based on different image patch sets. Also, if an occlusion is determined to be present, the corresponding image patch set may be generated based on portions of the face area that actually appear in an image without consideration of the occlusion region, such as through the above synthetization or filling of face area information for the occlusion region from reference information. Through this, such facial verification may be performed to be more robust to a presence of the occlusion region, and thus facial verification accuracy increases, compared to previous technological facial verification techniques.

Figure 8A:
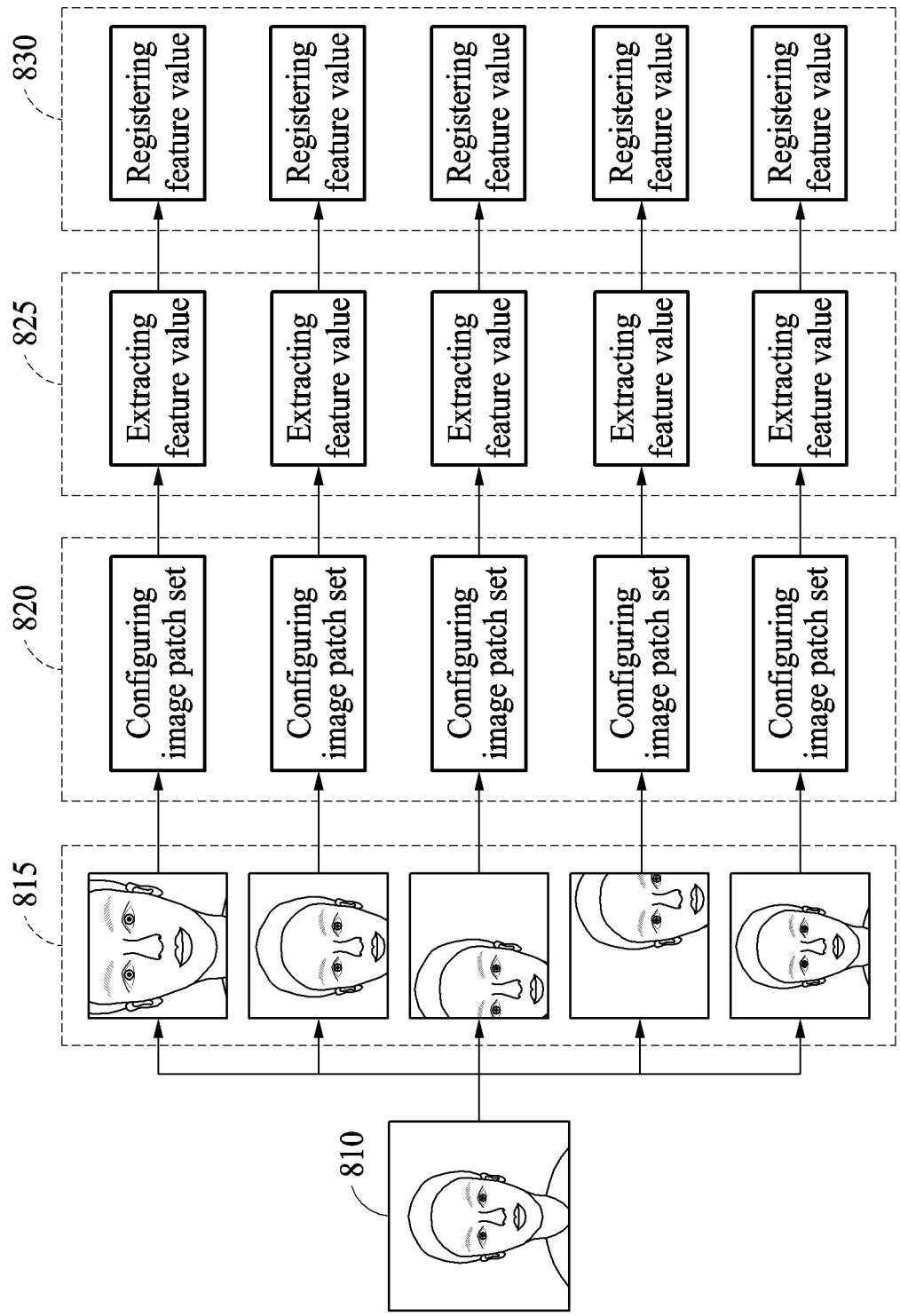
FIGS. 8A and 8B illustrate examples of a process of registering a face, in accordance with varying embodiments.
Figure 8B:
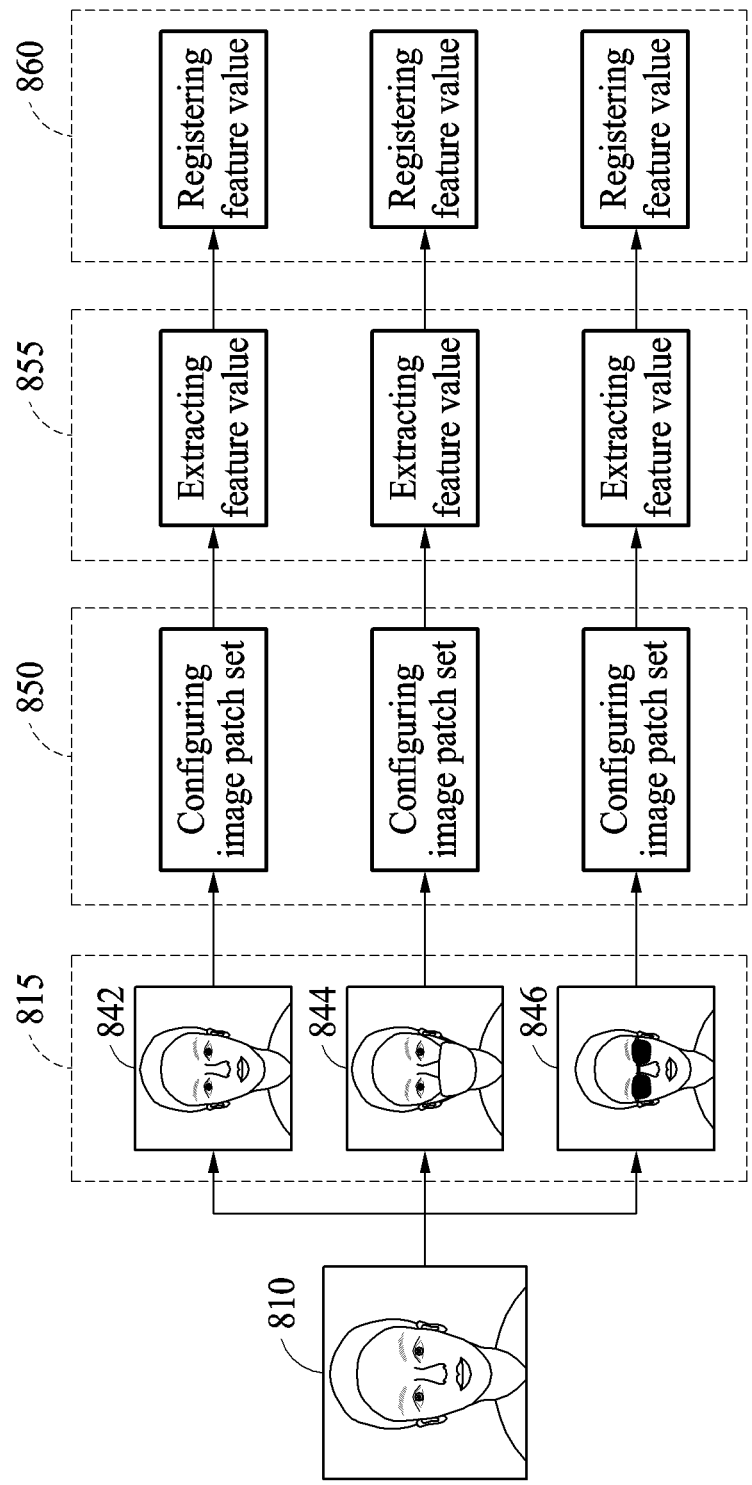

FIGS. 8A and 8B illustrate examples of a process of registering a face, in accordance with varying embodiments.

To perform facial verification, a face registration process may be performed to register a face of a value user or extracted features of the face of the user in advance of the facial verification. For example, the facial verification apparatus may perform the face registration process before making such facial verification features of the facial verification apparatus available to a user. In the facial registration process, feature values extracted from one or more face images and/or one or more face images of the user may be registered or stored. FIG. 8A is a diagram illustrating an example of the face registration process in which respective feature values corresponding to different detection positions of a face area are registered. In one example, a user may cause or control an image 810 for a face registration to be obtained through the capturing of a face of the user using a camera, though the image 810 may also be automatically obtained upon detection of the user, or automatically obtained through outside controls other than based on actions of the user, such as in an otherwise automated or controlled surveillance or monitoring system. In the face registration process, the image 810 of a full face is used. For example, the image preprocessing process may be performed on the image 810 as described with reference to operation 210 of FIG. 2, noting that embodiments are not limited thereto.

The facial verification apparatus generates partial images 815 corresponding to various detection positions of a face area based on the image 810. For example, the generated respective partial images 815 correspond to detection positions corresponding to an upper side, a lower side, a left side, a right side, and an inside of the face area. Each of the partial images 815 may be generated by cropping and normalizing a predetermined area in the image 810, though the example partial image corresponding to the detection position at inside for the face area may or may not include such cropping and/or normalization, depending on example. When the partial images 815 corresponding to the various detection positions of the face area are generated, respective image patch sets corresponding to each of the partial images 815 may be configured and generated in operation 820. Similarly to the aforementioned facial verification process, a feature extractor is used to extract a feature value from the image patches included in an example image patch set and the aforementioned reference image patches corresponding to the image patches in operation 825, e.g., corresponding to the detection position. As only an example, the feature extractor may be the same feature extractor used in the facial verification process, e.g., feature extractor 350 of FIGS. 3A-3C and 5A-5B. Each of the extracted feature values may then be registered and stored in operation 830 for each of the various detection positions, i.e., for later comparison with extracted feature values of input images in subsequent facial verification operations. Here, the aforementioned descriptions about such facial verification processes are also applicable to operations 820 and 825, and thus such discussion are not repeated here merely for brevity purposes.

FIG. 8B is a diagram illustrating another example of the face registration process, where corresponding feature values are registered based on the consideration of potential occlusion regions being present in a face area. Referring to FIG. 8B, images 842, 844, and 846 are generated based on the image 810 used for the face registration, e.g., an image captured for the particular purpose of face registration. Here, the generated image 842 does not include an occlusion region, while virtual occlusion regions are added or applied to the image 810 (or to the image 842) to generate images 844 and 846. Thus, for example, the image 844 may be generated by applying an occlusion region of a mask to the image 842, while the image 846 may be generated by applying an occlusion region of sunglasses to the image 842. Additional occlusion regions may also be considered, with alternate additional occlusion regions being respectively applied to the image 842 to generate additional images for the partial images 815. The image 842 may be an image obtained by normalizing the image 810. For each generated image of the partial images 815, an image patch set corresponding to each of the images 842, 844, and 846 is configured and generated in operation 850. Respective feature values may then be extracted based on each image patch set and corresponding reference image patch sets by a feature extractor in operation 855. In an example, the feature extractor may be the same feature extractor as discussed above with respect to FIGS. 3A-3C, 5A-5GB, or 7. The image patch set may include one or more image patches where the applied occlusion regions in the partial images 815 are not subsequently included or maintained, such as by the aforementioned synthesizing or filling of areas/regions corresponding to the applied occlusion regions with other data, as discussed above with respect to FIG. 7, for example. When the extracted feature values are registered in operation 860, respective feature values corresponding to the different cases in which an occlusion region is absent and those in which various occlusion regions are present may be registered.

Herein, a neural network includes a plurality of layers, and each of the layers includes a plurality of nodes, and is implemented by one or more processors of the facial verification apparatus. For example, there may be an input layer, at least one hidden layer, and an output layer. Depending on the architecture of the neural network, nodes included in neighboring layers may be selectively connected according to respective trained connection weights and nodes within layers may be connected through kernels or other connection weights. For example, the neural network may be implemented by such a processor, i.e., the one or more processors of the facial verification apparatus, configured to generate a neural network structure/architecture with such a plurality of layers each including plural nodes and configured to apply such weighted connections between neighboring nodes in neighboring layers of the neural network structure, and/or kernel elements and/or other weighted connection between nodes within such layers, to interpret input data applied to the neural network structure. As only examples, herein such an 'interpretation' of input data may include a performed feature extraction, recognition, verification, and/or rejection, such as for image recognition or verification, as well as any other trained objective(s) of the respective layers, collection of layers, and/or whole neural network, such as where a layer or collection layers is represented by any of the feature extractors described herein that may each be trained for different feature extraction objectives, for example, and which may be combined in a larger collection of layers (e.g., in various parallel and/or serial arrangements) with further classification or comparison layer(s) to perform the comparisons of extracted features with registered features, as well as an ultimate verification successfulness result. Thus, based on the training data and desired interpretation objective(s), the architecture, selective connections between neighboring nodes and kernels and connection weights within layers may be varied during training until the neural network is trained to a desired acceptability for the desired interpretation objective(s). For example, in examples where the neural network is trained for the image verification or rejection, the neural network may include convolutional layers or be representative of a convolutional neural network (CNN), and thus the respective convolutional kernel elements, e.g., for varying feature extractions through feature kernels and other connection weights may be trained to an predetermined desired acceptability for feature extraction and/or face verification or rejection operations, such as performed by the training apparatus 1100 of FIG. 11. The neural network may also be of a different type of neural network and merely include one or more convolutional layers, e.g., for selective feature extraction, for other objectives. Returning to the training of the neural network, the resultant kernels and connection weights of the trained neuro network may be referred to as parameters of the neural network, e.g., demonstrated as at least trained kernel values of a convolutional layer or other connection weights between layers, as only examples. As an example, the neural network may be trained based on labeled input image information or desired corresponding output images, feature extractions, or classifications, as only examples, such as through a loss considering backpropagation or simulated annealing algorithms. For example, the neural network may be trained to extract features of training data. Thus, in the training, connection weightings between nodes of different hidden layers and/or kernels of convolutional layers are recursively adjusted until the corresponding neural network model is trained with a desired accuracy rate or below a maximum error rate, for example. The trained neuro network may be stored in a memory of the training or recognition apparatus, for example, in any of the facial verification apparatuses discussed herein. In examples, the trained neural network may be stored in trained vectors, matrix or matrices, or other formats, e.g., where elements of the vectors, matrices, or other formats represent or suggest the corresponding trained parameters of trained weighted connections and/or kernels, as only examples, of the corresponding neural network structure. The stored trained neural network may further include hyper-parameter information, which may define the specific structure or architecture of the corresponding neural network for which the example stored trained parameters correspond to. The hyper-parameters may define the architecture or structure of the inputs and output layers as well as how many hidden layers there are and the function and structure/architecture of the respective hidden layers, such the respective arrangement and which are fully connected or dense, recurrent, bi-directionality, convolutional, de-convolutional, or pooling layers, as only examples. The hyper-parameters may further include information of the configuration and values of any bias and/or contextual nodes in the neural network, corresponding activation functions of the nodes, types of nodes, such as long short-term memory nodes, and define any or any further recurrent structures of the neural network, which may vary depending on embodiment and interpretation objective of the trained neural network.

Accordingly, before or during operations of FIGS. 2-10, as only examples, the facial verification apparatus may acquire such trained parameters, and input information of the captured or stored images as discussed herein to any of the extractors, as described, that are specially configured using the acquired trained parameters to perform the corresponding described operations as described with respect to the feature extractions and verification described herein as non-limiting examples.

In addition, one or more of the feature recognizers or extractors implemented in, and represented by, operations 350 of FIGS. 3A-3C, 5A-5B, and 7 and operation 825 and 855, as only non-limiting examples, may also be implemented only through a specially configured hardware module or implemented through hardware and instructions stored in/on non-transitory media, e.g., of or exterior to the facial verification apparatus, that, when executed by one or more processors of the hardware, for example, cause the processor to implement any, any combination, or all of the operations described herein. Still further, though such operations refer to an example feature recognizers or extractors, each of such feature recognizers or extractors may include plural distinct recognizers or extractors trained for different objectives and which results thereof together may be used in the respective subsequent verification determination. As one example, such distinct recognizers or extractors for any one of the above noted feature recognizers or extractors could be reflected as respectively different trained kernels in a same convolutional layer of the example neural network. In addition, though a trained neural network (or respective neural networks) or machine learning implemented feature recognizers or extractors may be discussed with respect to FIGS. 2-11, embodiments are not limited thereto.

FIG. 9 illustrates an example of a facial verification apparatus in accordance with one or more embodiments.

Referring to FIG. 9, a facial verification apparatus 900 obtains, e.g., captures, reads, or receives, one or more input images for facial verification. The input images may include color information, grayscale information, depth information, and/or infrared information, as only non-limiting examples. The facial verification apparatus 900 determines whether the facial verification is successful based on a result of comparison between one or more feature values extracted from the input image and one or more registered feature values stored in a database 930. For example, in a registration example the verification apparatus 900 obtains an image of a valid user, registers a face of the valid user and/or one or more features derived and/or extracted from the face of the valid user through a face registration process of the facial verification apparatus 900, i.e., in advance of a verification operation. For example, the verification apparatus 900 may store the registered information in the database 930 in a form of one or more feature values extracted from one or more face images.

The face verification apparatus 900 is configured to perform one or more or all face verification methods and processes described or illustrated in the present disclosure, e.g., including those of training feature extractors and/or verification neural networks or other machine learning models, registering feature information obtained using such trained feature extractors, and performing one or more verification processes using such trained feature extractors and the registered feature information. The face verification apparatus 900 is further configured to implicitly and/or explicitly indicate or provide a result of face verification to a user, a remote server, or a service provider. For example, the face verification apparatus 900 may explicitly indicate or output the result of face verification in a form of, for example, a sound, a vibration, characters, a picture, and a moving image, but not limited thereto. As noted above, the face verification apparatus 900, which may correspond to any of the face verification apparatuses described herein, may indicate the verification result in various implicit and/or explicit forms.

The facial verification apparatus 900 includes one or more processors 910 and one or more memories 920, hereinafter respectively referred to as the processor 910 and the memory 920. The memory 920 may be connected to the processor 910, and stores instructions implementable by the processor 910, and data to be processed by the processor 910 or data processed by the processor 910, to control the processor 910 to implement one or more or all methods or processes described herein, for example. The memory 920 includes a non-transitory computer-readable medium, for example, a high-speed random access memory (RAM) and/or a non-volatile computer-readable storage medium (e.g., at least one disk storage device, a flash memory device, or other nonvolatile solid state memory devices).

The processor 910 may execute instructions to perform at least one operation described with reference to FIGS. 1 through 11. For example, the processor 910 detects a face area of a user from an input image and generates a plurality of image patches including at least a portion of the face area based on an image patch set determination criterion. The processor 910 extracts a feature value of an input face using a feature extractor and determines whether a facial verification is successful based on a comparison result between the extracted feature value and a registered feature value. The processor 910 may be configured to train the feature extractor, as well as acquire or load trained parameters of the trained feature extractor, and be configured according to the trained parameters to represent the feature extractor through one or more neural networks or other machine learning models, as only examples. The processor 910 may also be configured to train verification portions of one or more neural networks or machine learning models, or further the same neural networks or machine learning models training as the feature extractor, and configured to acquire or load the trained parameters for such verification portions to perform verification processes that compare feature(s) extracted by the feature extractor to registration information for determining whether verification is successful or whether verification is unsuccessful. The processor 910 is further configured to generate image patches based on a select set composition, among plural predefined set compositions, corresponding to the image patch set determination criterion.

In an example, the image patch set determination criterion may be a detection position of the face area. For example, when the position of the face area is detected to be a predefined first area, the processor 910 generates image patches based on a predefined first set composition corresponding to the first area, while when the position of the face area is detected to be a predefined second area, the processor 910 generates image patches based on a predefined second set composition corresponding to the second area. In an example, the image patch set determination criterion may additionally or alternatively be whether an occlusion region is present in the face area. For example, the processor 910 may generate image patches based on one or more predefined first set compositions when respective occlusion regions are determined to be present in a detected face area, while alternatively generate image patches based on a predefined second set composition when such occlusion regions are not determined to be present or are determined to be absent in a detected face area. In addition, the processor 910 may be further configured to perform normalization of the input image and/or configured such that when a portion of the detected face region of the input image is out of a visual field of a camera or obscured or occluded by an object such as glasses, sunglasses, a mask, or a hat, the processor 910 performs padding on the portion based on a reference image, e.g., a filling or synthesizing of the portion of the detected face region, an occluded face region, or a missing face region with predetermined image information, or corresponding image information from an average image, an average value image, or a predetermined single color image, as only examples.

The processor 910 determines the feature value using a feature extractor using differences between the generated image patches included in the image patch set and select reference image patches predetermined as corresponding to the composition of the generated image patches. For example, the reference image patches are selected or determined based on any one or any combination of a detected position of the face area, whether and/or where an occlusion region is determined to be present in the face area, a determination of a facial expression, and/or distinguishing between facial expressions, appearing in the face area, user information estimated based on the face area, a determined illumination state of the input image, and a determined image quality of the input image. For example, different reference images may be selected for different detected positions of respectively differently determined face areas and/or different reference images may be selected for different determined occlusion regions and the lack of occlusions in such differently determined face areas. Further, reference images matching or corresponding to a determined facial expression may be selected from among multiple different reference images for different facial or non-facial expressions. For example, for each of the example predefined compositions for a detected position and/or determined occlusion region, there may be different predefined (e.g., previously generated) facial expression or non-expression reference images to select from dependent on the determination of the facial expression. Similarly, for each of the user information estimated based on the face area, determined illumination state of the input image, and/or determined image quality of the input image, there may be different predefined reference images for each of the predefined compositions for a detected position and/or determined occlusion region. In an example, such different reference images may also be generated in real time during the verification operation based on a lesser number of predefined reference images, e.g., so to match or correspond to the determined facial expression, the user information estimated based on the face area, determined illumination state of the input image, and/or determined image quality of the input image. Still further, though examples are from the perspective of there being such different reference images for each of the predefined compositions for the predefined compositions for a detected position and/or determined occlusion region, examples are not limited thereto and such different reference images may be selected independent of the predefined compositions for a detected position and/or determined occlusion region. The processor 910 is configured to calculate a similarity between the determined feature value and corresponding registered values. For example, the corresponding registered values may each correspond to a feature extraction performed, e.g., by the processor 910 during a registration process of the facial verification apparatus 900, for image patches corresponding to a different predefined composition for different detected positions and/or different occlusion regions. When the similarity is determined to meet, e.g., be greater than, a threshold, the processor 910 determines that the facial verification is successful, while when the similarity is determined to not meet, e.g., be less than or equal to, the threshold, the processor 910 may determine that the facial verification is a failure. Herein, though examples are discussed with respect an example threshold, embodiments are not limited to one such threshold, and different thresholds may be alternatively be used, e.g., depending on the selected composition for a detected position and/or determined occlusion region, as only an example, and/or dependent on any of a detection of a facial expression in the face area, the user information estimated based on the face area, the illumination state of the input image, and/or image quality of the input image, as non-limiting examples.

FIG. 10 illustrates an example of a computing apparatus in accordance with one or more embodiments.

Referring to FIG. 10, a computing apparatus 1000 performs a facial verification process by obtaining, e.g., through capturing, reading, or inputting, an image including a face of a user and comparing a feature extracted from the obtained image and a registered feature. The computing apparatus 1000 may correspond to the computing apparatus 120 of FIG. 1, the facial verification apparatus 900 of FIG. 9, as well as the training apparatus 1100 of FIG. 11, as non-limiting examples.

The computing apparatus 1000 includes a processor 1010, a memory 1020, a camera 1030, a storage device 1040, an input device 1050, an output device 1060, and a network interface 1070. The processor 1010, the memory 1020, the camera 1030, the storage device 1040, the input device 1050, the output device 1060, and the network interface 1070 may communicate with one another through a communication bus 1080.

The camera 1030 captures a still image, a video image, or both. The processor 1010 may control the camera 1030 to obtain or capture an image, e.g., including a face region, of a user by capturing an image for the face region of the user attempting at the facial verification, or may control the camera 1030 to autonomously capture images and automatically verify a user, for example, without user initiation. In addition, as noted above, the camera 1030 may also be controlled by the processor 1010 during other functions of the computing apparatus 1000, such as when operated as a personal camera. The camera 1030 may be representative of plural cameras, such as a color image/video camera and a depth or infrared camera or time of flight (TOF) module, as only non-limiting examples. Thus, under control of the processor 1010, for example, the camera 1330 may obtain a face image of a user by capturing an image of a face area that may be input by the user in attempt at a facial verification. The obtained image may be or include, for example, a color image, a black-and-white image, an infrared image, and/or a depth image.

The processor 1010 may implement functions and instructions to operate in the computing apparatus 1000 as described herein. For example, the processor 1010 may execute instructions stored in the memory 1020 or the storage device 1040. The processor 1010 may be the same one or more processors as the processor 910 of FIG. 9 or the processor 1110 of FIG. 11. The processor 1010 is configured to perform one or more, any combination, or all operations described with reference to FIGS. 1 through 11. For example, the processor 1010 extracts a feature value from an image obtained by the camera 1030, compares the extracted feature value to a previously registered feature value, and determines whether a facial verification is successful based on a result of the comparing. The processor 1010 configures an image patch set including a plurality of image patches based on the obtained image and extracts a feature value from the image patch set using a feature extractor. In addition, the processor 1010 is configured to control other functions of the computing apparatus 1000. For example, the computing apparatus 1000 may be mobile device, such as a mobile phone, tablet, or personal computer, and thus the processor 1010 is further configured to implement other typical functions of the computing apparatus 1000. In an example, the processor 1010 may be configured to implement a lock-out operation to only permit a user to access or implement such other typical functions, to selectively enable the user to acquire additional privileges of such functions, and/or utilize and implement payment functions, as only non-limiting examples, upon a successful verification of the user's captured face image.

The storage device 1040 includes a computer-readable storage medium or a computer-readable storage device. The storage device 1040 stores a DB including the aforementioned registered features and/or registered images. The DB may further store the aforementioned reference images. The storage device 1040 includes, for example, a magnetic disk drive, an optical disc, a flash memory, an erasable programmable read-only memory (EPROM), a floppy disk, or other types of nonvolatile memories well-known in the technical field to which the present disclosure pertains.

The input device 1050 obtains, e.g., captures, reads, or receives, an input from the user through a tactile, video, audio, or touch input, as non-limiting examples. The input device 1050 includes one or more of a keyboard, a mouse, a touchscreen, a microphone, and other devices configured to detect the input from the user and transmit the detected input to the computing apparatus 1000.

The output device 1060 provides the user with an output of the computing apparatus 1000 through a visual, auditory, or tactile channel. For example, the output device 1060 may visualize information related to the facial verification and provide the user with the visualized information. For example, the visualized information may indicate whether the facial recognition was successful, or may enable access to further functions of the computing apparatus 1000 demonstrated through the visualized information. The output device 1060 includes, for example, a liquid crystal display (LCD), a light-emitting diode (LED) display, a touchscreen, a speaker, a vibration generator, and other devices configured to provide the output to the user. In one example, during the facial registration or verification respectively being performed, the computing apparatus 1000 displays or visually feeds backs the currently captured face image, or a preview image, obtained by the camera 1030 on a display screen to be viewed by the user, or another guide, while in another example the computing apparatus 1000 does not display the example face image, preview image, or other guide.

The network interface 1070 communicates with an external device through a wired and/or wireless network. The network interface 1070 includes one or more, for example, of an Ethernet card, optical transceiver, a radio frequency transceiver, and other network interface cards configured to transmit and receive information. The network interface 1070 wirelessly communicates with the external device using a communication method, such as, for example, Bluetooth, WiFi, or a third generation (3G) or fourth generation (4G) communication method. The network interface 1070 may further include a near field transceiver or the like. For example, through control of the processor 1010 upon verification of a user, the near field transceiver may transmit a payment authorization to an external terminal, such as with an appropriate mobile payment instruction transmitted by the near field transceiver. In addition, the processor 1010 may control the network interface 1070 to routinely check for updates for the registration and/or verification trained feature extractor (or trained feature extractor and verification portions) neural network, or other machine learning models, for example, and request, receive, and store parameters or coefficients of the same in the memory 1020 for use in the verification operations herein. For example, when the feature extractor and face verification is implemented though the above example trained neural network feature extractor and/or trained face verification networks, the processor 1010 may request, receive, and store updated trained weighting matrices for any or all of the feature extractor and/or the face verification neural network portions. In addition, updated hyper-parameters that can control or alter the configuration or architecture of such neural network(s) may also be requested, received, and stored along with corresponding trained weighting matrices in any of the memory 1020 or storage device 1040.

FIG. 11 is a diagram illustrating an example of a training apparatus in accordance with one or more embodiments.

Referring to FIG. 11, a training apparatus 1100 refers to an apparatus configured to train a feature extractor 1130 used for a facial verification, such as with respect to any or any combination of the feature extractors described herein, as non-limiting examples. For example, the feature extractor 1130 may be a neural network model configured to output a result value corresponding to an input value, and trained based on plural training images and reference images. The training apparatus 1100 may further train additional classification or comparison portions or objectives of such a neural network, in addition to the training of the example feature extractor 1130. The training apparatus 1100 may also generate one or more, any combination, or all of the aforementioned reference images, e.g., based on the considered training images.

The training apparatus 1100 includes at least one processor 1110 and a memory 1120. The memory 1120 is a non-transitory computer readable medium or device connected to the processor 1110, and stores instructions implementable by the processor 1110 to implement such training of the neural network(s), data to be processed by the processor 1110, and/or data processed by the processor 1110 during the training of the neural network(s). The memory 1120 further stores the resultant trained parameters of the neural network(s) after the training.

As only an example, and further to the above example training operation discussions, when one or more training images are input to the training apparatus 1100, the processor 1110 detects respective face regions in the training image(s), configures image patches and reference images, extracts features for the detected face regions or from determined differences between the image patches and the reference images, and respectively trains the example extractor 1130. The training may be performed for the above noted different objectives, as discussed above with respect to the face registering and facial verification processes of FIGS. 2-10, and thus, for further detailed description, reference may be made to such above descriptions of the feature extraction, registration, and facial verification processes provided herein.

In one example, the processor 1110 performs the training by calculating a loss that may be caused by a difference between a feature extracted by the feature extractor 1130 and an predetermined correct or labeled extraction feature, and continues to train the feature extractor 1130 by adjusting parameters included in the feature extractor 1130 to reduce the calculated loss, such as discussed above for training the example neural network or machine learning feature extractor. The training apparatus 1100 may repetitively perform the process described in the foregoing on each of numerous training images in order to adjust the parameters of the feature extractor 1130 to be gradually more desirable, such as through the neural network example convolutional layer kernel element adjustments and connection weighting adjustments between nodes of different hidden layers being recursively adjusted until the corresponding neural network or machine learning models, as non-limiting examples, of the feature extractor 1130 is trained with a desired accuracy rate or below a maximum error rate, for example, such as through the above noted back-propagation example. Thus, all above descriptions about feature extraction, registration, and facial verification processes are also applicable to the training apparatus 1100. The trained feature extractor 1130 may be used in the face registering process and the facial verification process described above with respect to FIGS. 1-10.

The computing apparatus 120, camera 130, display 150, respective feature extractors 350, face verification apparatus 900, processor 910, memory 920, database 930, computing apparatus 1000, processor 1010, memory 1020, camera 1030, storage device 1040, input device 1050, output device 1060, and network device 1070, bus 1080, training apparatus 1100, processor 1110, memory 1120, and feature extractor 1130 in FIGS. 1-11 and that perform the operations described in this application are implemented by hardware components configured to perform the operations described in this application that are performed by the hardware components. Examples of hardware components that may be used to perform the operations described in this application where appropriate include controllers, sensors, generators, drivers, memories, comparators, arithmetic logic units, adders, subtractors, multipliers, dividers, integrators, and any other electronic components configured to perform the operations described in this application. In other examples, one or more of the hardware components that perform the operations described in this application are implemented by computing hardware, for example, by one or more processors or computers. A processor or computer may be implemented by one or more processing elements, such as an array of logic gates, a controller and an arithmetic logic unit, a digital signal processor, a microcomputer, a programmable logic controller, a field-programmable gate array, a programmable logic array, a microprocessor, or any other device or combination of devices that is configured to respond to and execute instructions in a defined manner to achieve a desired result. In one example, a processor or computer includes, or is connected to, one or more memories storing instructions or software that are executed by the processor or computer. Hardware components implemented by a processor or computer may execute instructions or software, such as an operating system (OS) and one or more software applications that run on the OS, to perform the operations described in this application. The hardware components may also access, manipulate, process, create, and store data in response to execution of the instructions or software. For simplicity, the singular term "processor" or "computer" may be used in the description of the examples described in this application, but in other examples multiple processors or computers may be used, or a processor or computer may include multiple processing elements, or multiple types of processing elements, or both. For example, a single hardware component or two or more hardware components may be implemented by a single processor, or two or more processors, or a processor and a controller. One or more hardware components may be implemented by one or more processors, or a processor and a controller, and one or more other hardware components may be implemented by one or more other processors, or another processor and another controller. One or more processors, or a processor and a controller, may implement a single hardware component, or two or more hardware components. A hardware component may have any one or more of different processing configurations, examples of which include a single processor, independent processors, parallel processors, single-instruction single-data (SISD) multiprocessing, single-instruction multiple-data (SIMD) multiprocessing, multiple-instruction single-data (MISD) multiprocessing, and multiple-instruction multiple-data (MIMD) multiprocessing.

The methods illustrated in FIG. 1-11 that perform the operations described in this application are performed by computing hardware, for example, by one or more processors or computers, implemented as described above executing instructions or software to perform the operations described in this application that are performed by the methods. For example, a single operation or two or more operations may be performed by a single processor, or two or more processors, or a processor and a controller. One or more operations may be performed by one or more processors, or a processor and a controller, and one or more other operations may be performed by one or more other processors, or another processor and another controller. One or more processors, or a processor and a controller, may perform a single operation, or two or more operations.

Instructions or software to control computing hardware, for example, one or more processors or computers, to implement the hardware components and perform the methods as described above may be written as computer programs, code segments, instructions or any combination thereof, for individually or collectively instructing or configuring the one or more processors or computers to operate as a machine or special-purpose computer to perform the operations that are performed by the hardware components and the methods as described above. In one example, the instructions or software include machine code that is directly executed by the one or more processors or computers, such as machine code produced by a compiler. In another example, the instructions or software include higher-level code that is executed by the one or more processors or computers using an interpreter. The instructions or software may be written using any programming language based on the block diagrams and the flow charts illustrated in the drawings and the corresponding descriptions in the specification, which disclose algorithms for performing the operations that are performed by the hardware components and the methods as described above.

The instructions or software to control computing hardware, for example, one or more processors or computers, to implement the hardware components and perform the methods as described above, and any associated data, data files, and data structures, may be recorded, stored, or fixed in or on one or more non-transitory computer-readable storage media. Examples of a non-transitory computer-readable storage medium include read-only memory (ROM), random-access memory (RAM), flash memory, CD-ROMs, CD-Rs, CD+Rs, CD-RWs, CD+RWs, DVD-ROMs, DVD-Rs, DVD+Rs, DVD-RWs, DVD+RWs, DVD-RAMs, BD-ROMs, BD-Rs, BD-R LTHs, BD-REs, magnetic tapes, floppy disks, magneto-optical data storage devices, optical data storage devices, hard disks, solid-state disks, and any other device that is configured to store the instructions or software and any associated data, data files, and data structures in a non-transitory manner and provide the instructions or software and any associated data, data files, and data structures to one or more processors or computers so that the one or more processors or computers can execute the instructions. In one example, the instructions or software and any associated data, data files, and data structures are distributed over network-coupled computer systems so that the instructions and software and any associated data, data files, and data structures are stored, accessed, and executed in a distributed fashion by the one or more processors or computers.

While this disclosure includes specific examples, it will be apparent after an understanding of the present disclosure of this application that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A processor implemented facial verification method comprising:
    detecting a face area of a user from an obtained input image;
    generating a plurality of image patches, differently including respective portions of the detected face area, based on a consideration of an image patch set determination criterion with respect to the detected face area;
    extracting a feature value corresponding to a face of the user based on an image patch set including the generated plurality of image patches;
    determining whether a facial verification is successful based on the extracted feature value; and
    indicating a result of the determination of whether the facial verification is successful,
    wherein the result of the determination of whether the facial verification is successful is a result of the determination of whether the facial verification successfully identifies the user as matching a previously determined valid user.

2. The method of claim 1, wherein the extracting of the feature value comprises providing image information derived from the plurality of image patches to a trained feature extractor neural network, an output of the trained feature extractor neural network being the extracted feature value.

3. The method of claim 2, wherein the method further includes determining the image information by comparing the plurality of image patches to different select reference images, the different select reference images being selected dependent on the consideration of the image patch set determination criterion or based on a selected composition of the plurality of the image patches that is dependent on the consideration of the image patch set determination criterion.

4. The method of claim 2, wherein the determining of whether the facial verification is successful includes comparing the extracted feature value to a select registration feature value, the select registration feature value being selected from plural registration feature values dependent on the consideration of the image patch set determination criterion or based on a select composition of the plurality of the image patches that is dependent on the consideration of the image patch set determination criterion.

5. The method of claim 4, further comprising generating the plural registration feature values by generating, for each of the plural registration feature values, a registration image set including a plurality of registration image patches, respectively and differently including respective portions of a corresponding registration face area, corresponding to different predetermined available results of considerations of the image patch set determination criterion with respect to input face areas, and extracting the plural registration feature values using the trained feature extractor neural network considering the respectively generated registration image sets.

6. The method of claim 1, wherein the consideration of the image patch set determination criterion with respect to the detected face area includes a determination of a detection position of the face area and/or whether an occlusion region is present in the detected face area.

7. The method of claim 1, wherein the consideration of the image patch set determination criterion with respect to the detected face area includes a determination of a detection position of the detected face area, and
the generating of the plurality of image patches comprises generating the plurality of image patches based on a set composition, among set predefined compositions for image patch sets, corresponding to the determined detection position of the detected face area.

8. The method of claim 7, wherein the generating of the plurality of image patches comprises:
generating, in response to the determined detection position of the detected face area being a predefined first area, the plurality of image patches based on a first set composition corresponding to the first area; and
generating, in response to the determined detection position of the detected face area being a predefined second area, the plurality of image patches based on a second set composition corresponding to the second area.

9. The method of claim 1, wherein the consideration of the image patch set determination criterion with respect to the detected face area includes a determination of whether an occlusion region is present in the detected face area, and
the generating of the plurality of image patches comprises:
generating the plurality of image patches based on a predefined first set composition in response to the occlusion region being determined to be present in the face area; and
generating the plurality of image patches based on a predefined second set composition in response to the occlusion region being determined to be absent in the face area.

10. The method of claim 9,
wherein the generating of the plurality of image patches based on the predefined first set composition further comprises generating the plurality of image patches from among a select one, as the predefined first set composition, of a plurality of first set compositions, and wherein the selected one of the plurality of the first set compositions is selected from among the plurality of first set compositions dependent on a determination of an occlusion type, from among different occlusion types, of the occlusion region.

11. The method of claim 1, wherein the extracting of the feature value comprises extracting the feature value based on the plurality of image patches included in the image patch set and reference image patches predetermined to correspond to a composition of the image patch set.

12. The method of claim 11, wherein the reference image patches are determined based on any one or any combination of a determined detection position of the detected face area, a determination of whether an occlusion region is present in the detected face area, a determination of a facial expression in the detected face area, a determination of user information estimated based on the detected face area, a determination of an illumination state of the input image, and a determination of an image quality of the input image.

13. The method of claim 11, wherein the extracting of the feature value comprises extracting the feature value using a feature extractor considering differences between the plurality of image patches included in the image patch set and the reference image patches each respectively predefined to correspond to respective forms of the plurality of image patches.

14. The method of claim 13, wherein the reference image patches are derived from training image patches used to train the feature extractor.

15. The method of claim 1, wherein the image patch set includes the generated plurality of image patches and an additional image patch corresponding to an indication of a result of the consideration of the image patch set determination criterion, and
the extracting of the feature value comprises extracting the feature value from image information derived from the generated plurality of image patches and the additional image patch.

16. The method of claim 1, wherein the performing of the consideration of the image patch set determination criterion with respect to the detected face area includes examining the input image based on the image patch set determination criterion,
wherein the generating of the plurality of image patches comprises generating the plurality of image patches based on a result of the examining of the input image.

17. The method of claim 16, wherein the examining of the input image comprises examining any one or any combination of a detection position of the detected face area, whether an occlusion region is present in the detected face area, a facial expression of the detected face area, user information estimated based on the detected face area, an illumination state of the input image, and an image quality of the input image.

18. The method of claim 1, wherein the extracting of the feature value comprises extracting the feature value using a single feature extractor neural network.

19. The method of claim 1, wherein the image patch set includes a first image patch corresponding to an overall area of the detected face area and a second image patch that is a zoomed-in image patch, of the detected face area, in comparison to the first image patch.

20. The method of claim 1, further comprising:
detecting facial landmarks in the detected face area; and
normalizing the detected face area based on the detected facial landmarks, wherein the generating of the plurality of image patches comprises generating the plurality of image patches based on the normalized face area.

21. A non-transitory computer-readable storage medium storing instructions that, when executed by a processor, cause the processor to perform the facial verification method of claim 1.

22. A facial verification apparatus comprising:
a processor configured to
detect a face area of a user from an obtained input image,
generate a plurality of image patches, differently including respective portions of the detected face area, based on a consideration of an image patch set determination criterion with respect to the detected face area,
extract a feature value corresponding to a face of the user based on an image patch set including the generated plurality of image patches,
determine whether a facial verification is successful based on the extracted feature value, and
indicate a result of the determination of whether the facial verification is successful,
wherein the result of the determination of whether the facial verification is successful is a result of the determination of whether the facial verification successfully identifies the user as matching a previously determined valid user.

23. The facial verification apparatus of claim 22, wherein the processor is configured to generate the plurality of image patches based on a set composition, among set predefined compositions for image patch sets, dependent on a result of the comparison of the image patch set determination criterion with respect to the detected face area.

24. The facial verification apparatus of claim 22, wherein the consideration of the image patch set determination criterion with respect to the detected face area includes determining a detection position of the face area, and
the processor is configured to:
generate, in response to the determined detection position of the detected face area being a predefined first area, the plurality of image patches based on a first set composition corresponding to the first area; and
generate, in response to the determined detection position of the detected face area being a predefined second area, the plurality of image patches based on a second set composition corresponding to the second area.

25. The facial verification apparatus of claim 22, wherein the consideration of the image patch set determination criterion with respect to the detected face area includes determining whether an occlusion region is present in the face area, and
the processor is configured to:
generate the plurality of image patches based on a predefined first set composition in response to the occlusion region being determined to be present in the face area; and
generate the plurality of image patches based on a predefined second set composition in response to the occlusion region being determined to be absent in the face area.

26. The facial verification apparatus of claim 25, wherein, in the generating of the plurality of image patches based on the predefined first set composition, the predefined first set composition is a selected one of a plurality of first set compositions, wherein the selected one of the plurality of the first set compositions is selected from among the plurality of first set com positions dependent on a determination of an occlusion type, from among different occlusion types, of the occlusion region.

27. The facial verification apparatus of claim 22, wherein the processor is configured to extract the feature value based on the plurality of image patches included in the image patch set and reference image patches predetermined to correspond to a composition of the image patch set.

28. The facial verification apparatus of claim 27, wherein the reference image patches are determined based on any one or any combination of a determined detection position of the detected face area, a determination of whether an occlusion region is present in the detected face area, a determination of a facial expression in the detected face area, a determination of user information estimated based on the detected face area, a determination of an illumination state of the input image, and a determination of an image quality of the input image.

29. The facial verification apparatus of claim 28, wherein the extracting of the feature value comprises extracting the feature value using a feature extractor considering differences between the plurality of image patches included in the image patch set and the reference image patches each respectively predefined to correspond to respective forms of the plurality of image patches.

30. The facial verification apparatus of claim 29, wherein the reference image patches are derived from training image patches used to train the feature extractor.

31. A processor implemented facial verification method comprising:
detecting a face area of a user from an obtained input image;
determining whether the face area is a partial face area and/or whether the face area includes an occlusion;
generating, based on a result of the determining, a first image patch including at least a first portion of the face area image;
generating, based on the result of the determining, a second image patch including at least a second portion of the face area image, the second image patch being different from the first image patch;
generating image information from the first image patch and the second image patch;
providing the generated image information to a feature extractor to extract a feature value corresponding to a face of the user; and
indicating whether a facial verification is successful based on a comparison of the extracted feature value to a registered feature value of plural registration feature values.

32. The method of claim 31,
wherein the generating of the image information from the first image patch and the second image patch includes obtaining differences between the first and second image patches and select reference image patches and generating the image information based on the obtained differences, and
wherein the select reference image patches are selected, dependent on the result of the determining of whether the face area is the partial face area and/or whether the face area includes the occlusion, from among a plurality of reference image patches.

33. The method of claim 31, further comprising performing a registration process to generate the plural registration feature values, each registration feature value being generated based on consideration, by the feature extractor, of respectively different registration image information of respective registration image patch sets, each respective registration image patch set including plural registration image patches selectively derived from a same registration image, wherein, in the comparison of the extracted feature value to the registered feature value of the plural registration feature values, the registered feature value is a select registered feature value of the plural registration feature values.

34. The method of claim 33, wherein the select one of the generated registration feature values is selected, from the plural registration feature values, dependent on a result of the determining of whether the face area is the partial face area and/or whether the face area includes the occlusion.

35. The method of claim 1, wherein the result of the determination of whether the facial verification is successful is a result of a determination of whether the facial verification successfully identifies the user.

\* \* \* \* \*